INVENTOR.
JOHN WICKS
BY
Smith, Olsen + Baird
ATTYS.

Outgoing Toll Selector 300

INVENTOR.
JOHN WICKS
BY
Smith, Olsen + Baird
ATTYS.

TOLL SWITCHING TELEPHONE SYSTEMS

Filed June 14, 1952 11 Sheets-Sheet 3

INVENTOR.
JOHN WICKS
BY
Smith, Olsen & Baird
ATTYS.

INVENTOR.
JOHN WICKS
BY
Smith, Olsen & Baird
ATTYS.

May 17, 1955 J. WICKS 2,708,692

TOLL SWITCHING TELEPHONE SYSTEMS

Filed June 14, 1952 11 Sheets-Sheet 5

INVENTOR.
JOHN WICKS

BY

Smith, Olsen + Baird
ATTYS.

INVENTOR.
JOHN WICKS
BY
Smith, Olsen & Baird
ATTYS.

INVENTOR.
JOHN WICKS
BY
Smith, Olsen & Baird

May 17, 1955 J. WICKS 2,708,692

TOLL SWITCHING TELEPHONE SYSTEMS

Filed June 14, 1952 11 Sheets-Sheet 8

INVENTOR.
JOHN WICKS
BY
Smith, Olsen & Baird
ATTYS.

INVENTOR.
JOHN WICKS
BY
Smith, Olsen & Baird
ATTYS.

INVENTOR.
JOHN WICKS
BY
Smith, Olsen + Baird
ATTYS.

May 17, 1955 J. WICKS 2,708,692

TOLL SWITCHING TELEPHONE SYSTEMS

Filed June 14, 1952 11 Sheets-Sheet 11

INVENTOR.
JOHN WICKS
BY
Smith, Olsen + Baird
ATTYS.

United States Patent Office 2,708,692
Patented May 17, 1955

2,708,692

TOLL SWITCHING TELEPHONE SYSTEMS

John Wicks, Biloxi, Miss., assignor to Automatic Electric Laboratories, Inc., Chicago, Ill., a corporation of Delaware Application June 14, 1952, Serial No. 293,511

12 Claims. (Cl. 179—27)

Figures 1, 2:
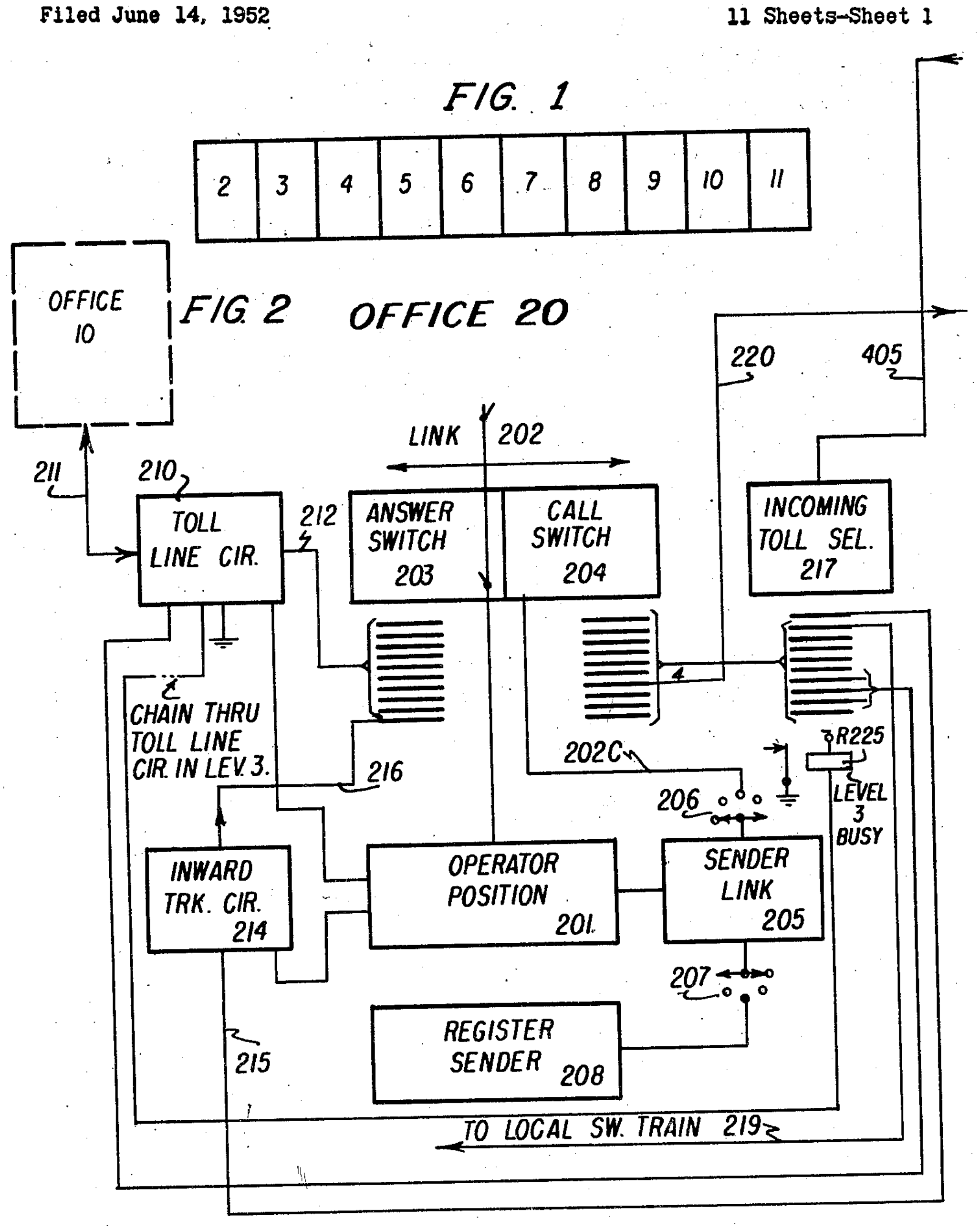

The present invention relates to toll switching telephone systems involving tandem related offices and more particularly to improved systems of the general character of that disclosed in United States Patent No. 2,167,710, granted on August 1, 1939, to Thomas F. Crocker.

The toll switching telephone system disclosed in the Crocker patent comprises a central office provided with an operator switchboard of the Strowger type, including automatic switching links and a key-controlled register sender, and a number of remote offices operatively connected to the central office by toll lines incorporating voice frequency repeaters of the vacuum tube type and terminated at the opposite ends thereof in repeaters of the voice frequency dialing and signalling type. In the arrangement, the central office switching apparatus and the remote office switching apparatus may be sequentially operated by appropriate digits sent from the register sender after the digits have been registered in the register sender by operation of the digit keyset at the operator switchboard. In the register sender, delay mechanism is provided that may be controlled for the purpose of delaying the sending operation thereof following the sending of any one of the series of digits registered therein. While this delay mechanism in the register sender may be selectively controlled by the central office switching apparatus, it cannot be selectively controlled by the remote office switching apparatus due to the provision of the toll lines interconnecting the central office and the remote office that incorporate voice current repeaters of the vacuum tube type that terminate at the opposite ends thereof in the repeaters of the voice frequency dialing and signalling type. In other words, there is no direct metallic connection between the central office switching apparatus and the remote office switching apparatus over the toll lines mentioned, by virtue of the incorporation in the toll lines of the voice current repeater of the vacuum tube type.

Accordingly, it is the general object of the present invention to provide in a toll switching telephone system of the character noted, an improved arrangement whereby either the originating office switching apparatus or the remote office switching apparatus involved in a toll connection may selectively control the sending operation of the register sender associated with the operator switchboard in the originating office.

Another object of the invention is to provide in a toll switching telephone system of the character noted, automatic level hunting Strowger switching apparatus in both the originating office and the remote office that are involved in tandem toll connections.

A further object of the invention is to provide a toll line terminated at the opposite ends thereof in voice frequency dialing and signalling repeaters, wherein the called one of the repeaters incorporates facility for returning over the toll line a first delay signal and the calling one of the repeaters incorporates facility responsive to the first delay signal received over the toll line for repeating a corresponding second delay signal over the incoming trunk thereto, wherein the first delay signal returned over the toll line takes the form of a pulse of a given frequency in the audio frequency band so that it may be repeated by any voice current repeaters of the vacuum tube type that may be incorporated in the toll line.

A still further object of the invention is to provide a repeater arrangement of the character noted, wherein a register sender is operatively connected to the incoming trunk to the calling repeater and embodies facility responsive to the second delay signal repeated over the incoming trunk for delaying further sending operation of the digits thereby over the incoming trunk.

Further features of the invention pertain to the particular arrangement of the circuit elements of the toll switching telephone system, whereby the above-outlined and additional operating features thereof are attained.

*Section 1.—The general arrangement of the telephone system*

Figure 10:
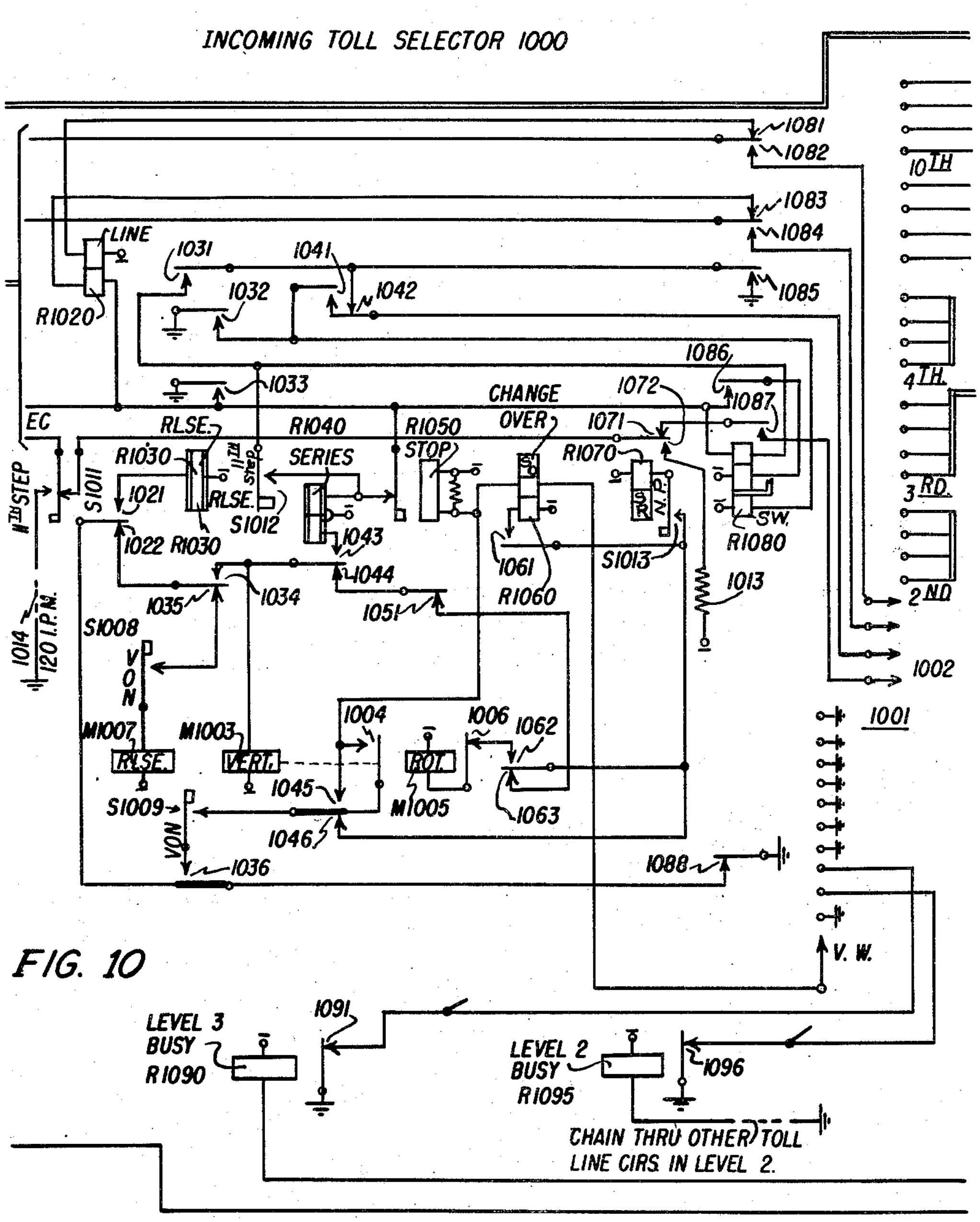
Figure 11:
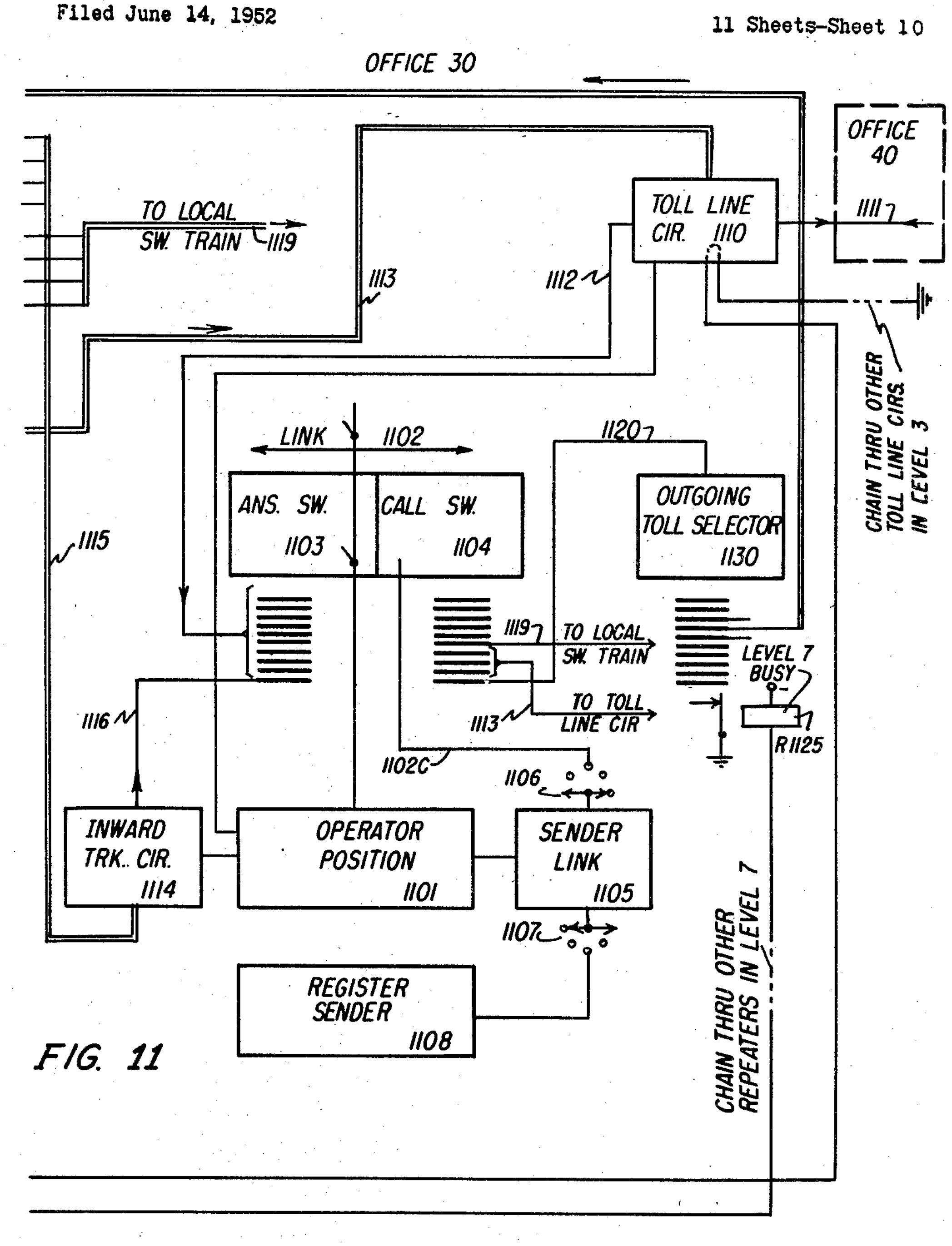
Figure 12:
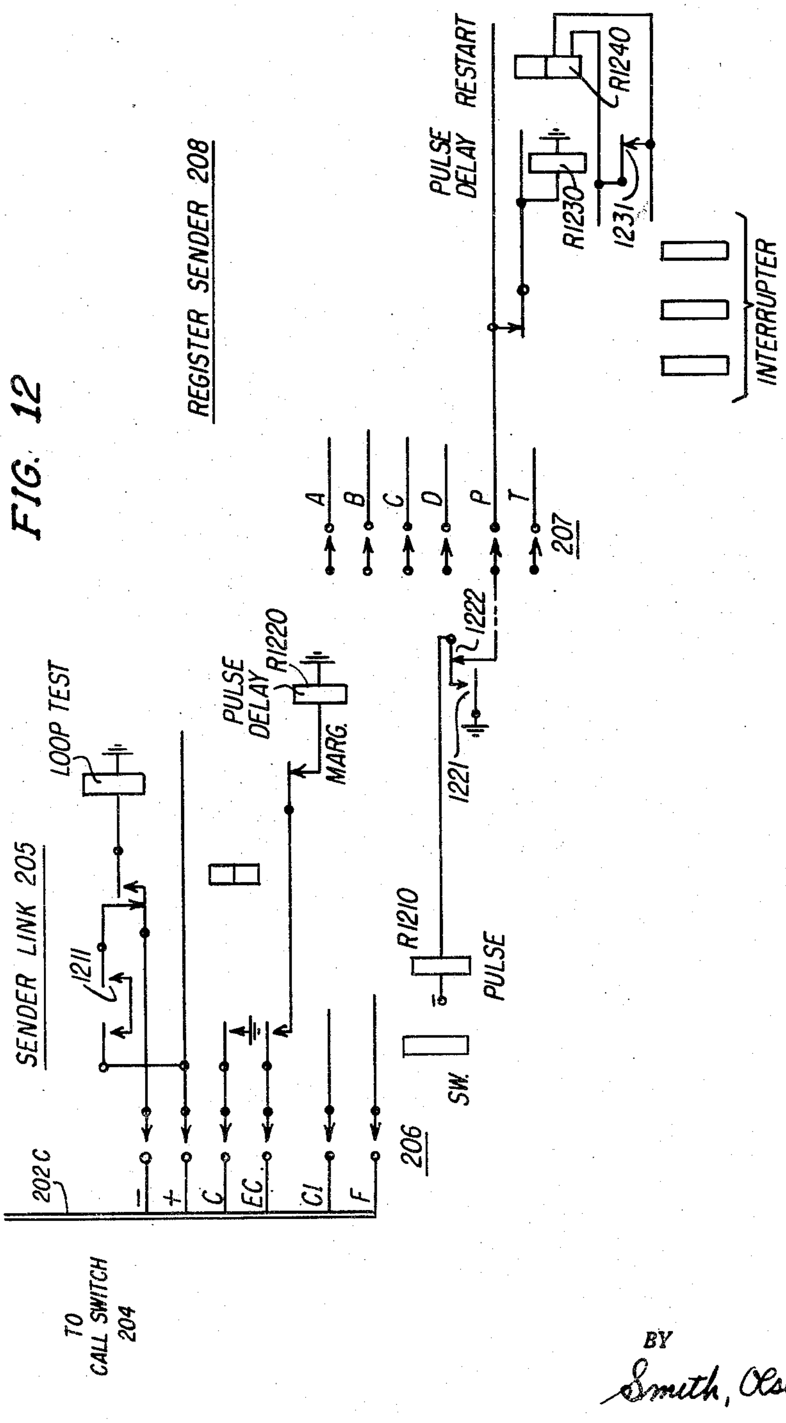

The invention, both as to its organization and method of operation, together with further objects and advantages thereof will best be understood by reference to the following specification taken in connection with the accompanying drawings, in which Figures 2 to 11, inclusive, taken together, illustrate the details of certain of the apparatus incorporated in two adjacent offices of a telephone system embodying the present invention; Fig. 1 illustrates the mode of combining Figs. 2 to 11, inclusive, to form a unified diagram; and Fig. 12 is a skeleton diagram of certain of the relay combinations incorporated in the sender link and the register sender provided in one of the offices of the telephone system.

Figure 3:
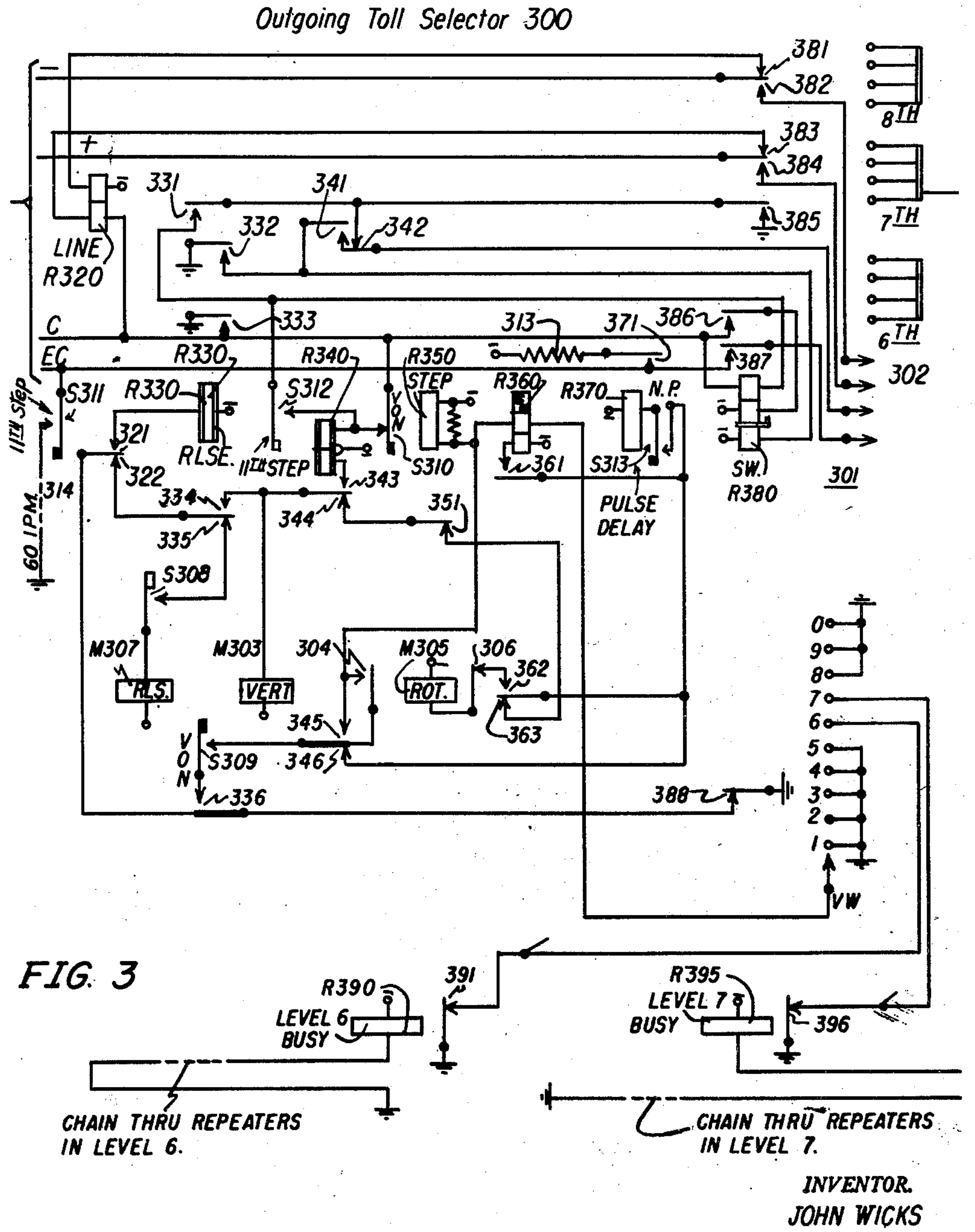
Figure 4:
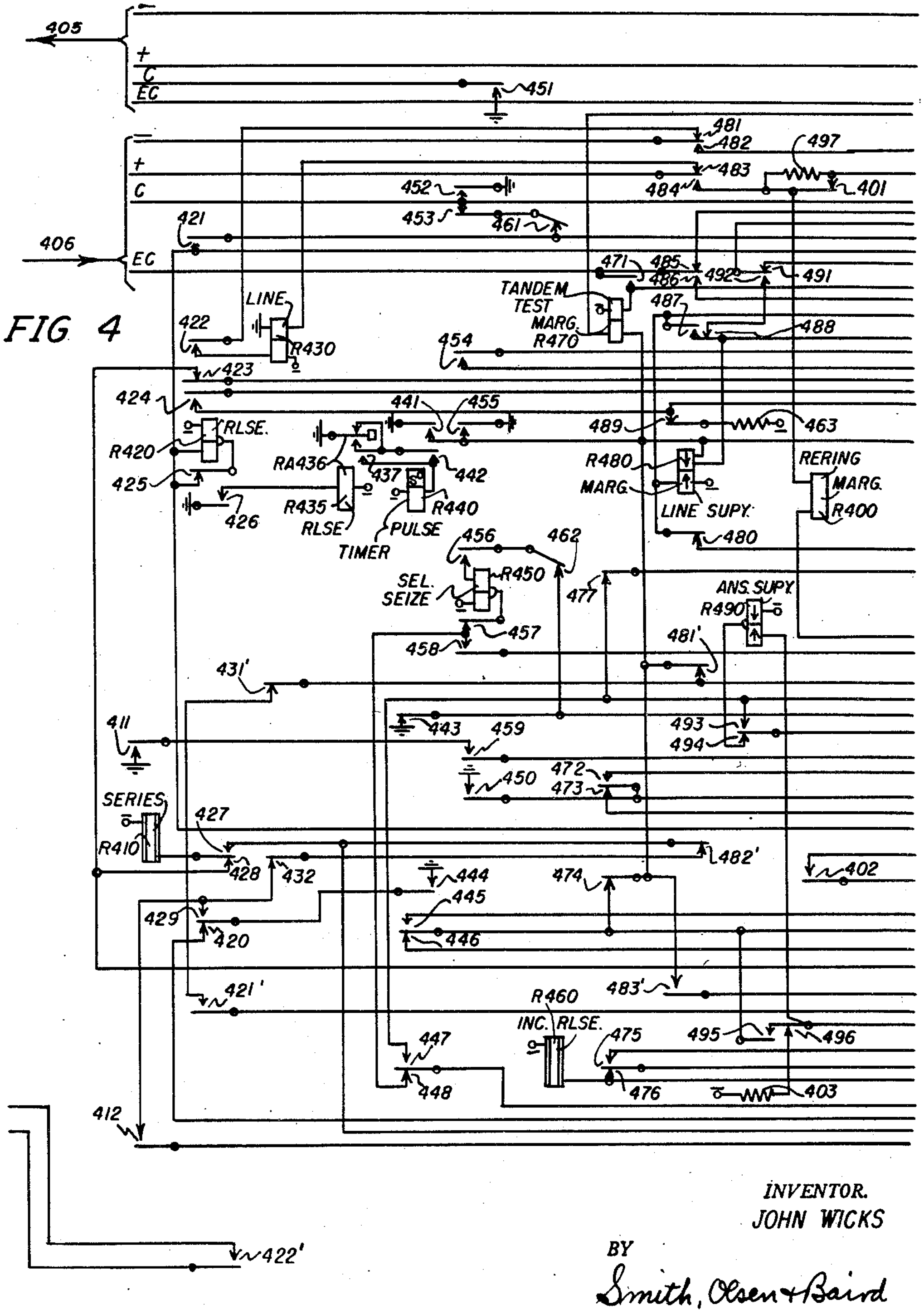
Figure 5:
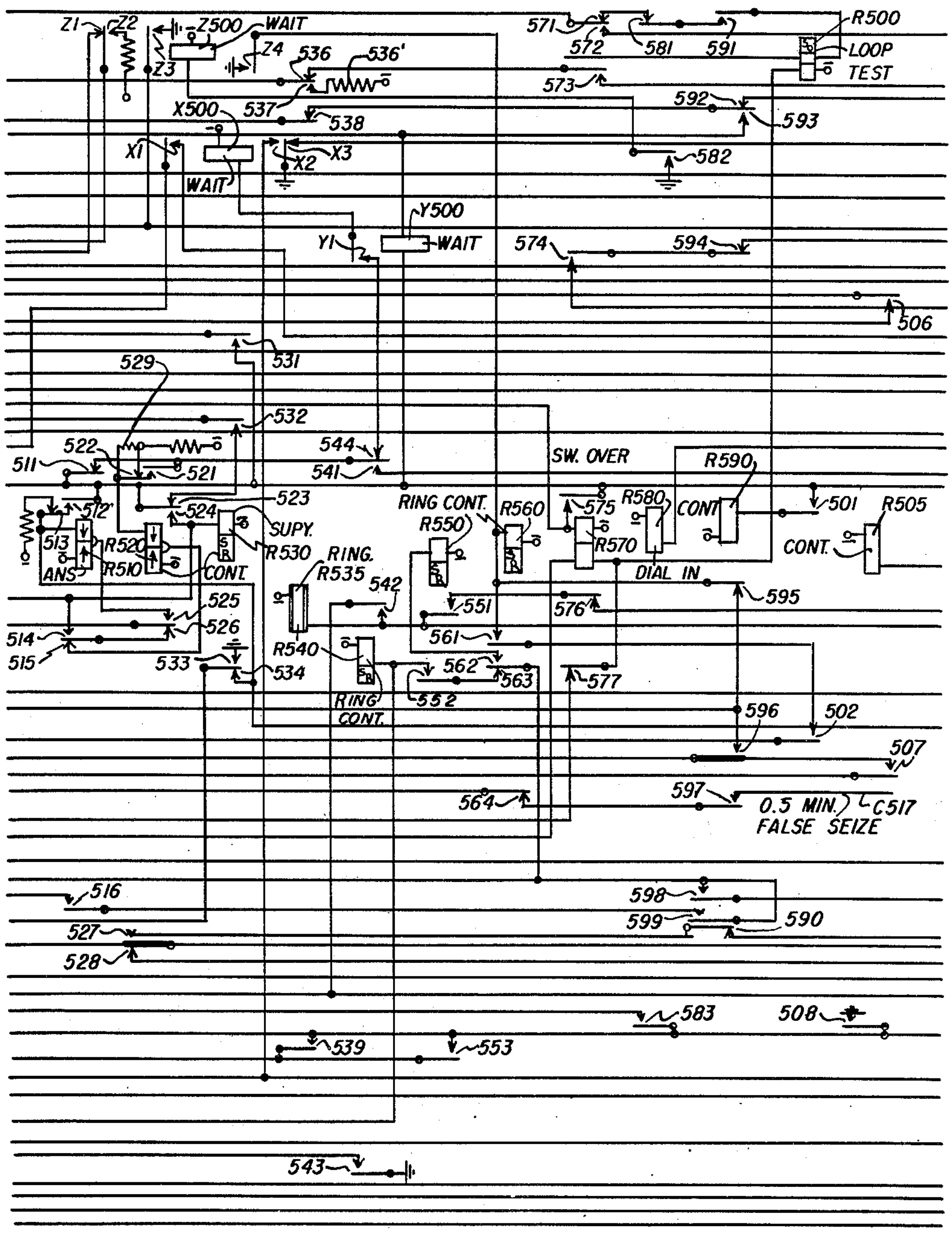
Figure 6:
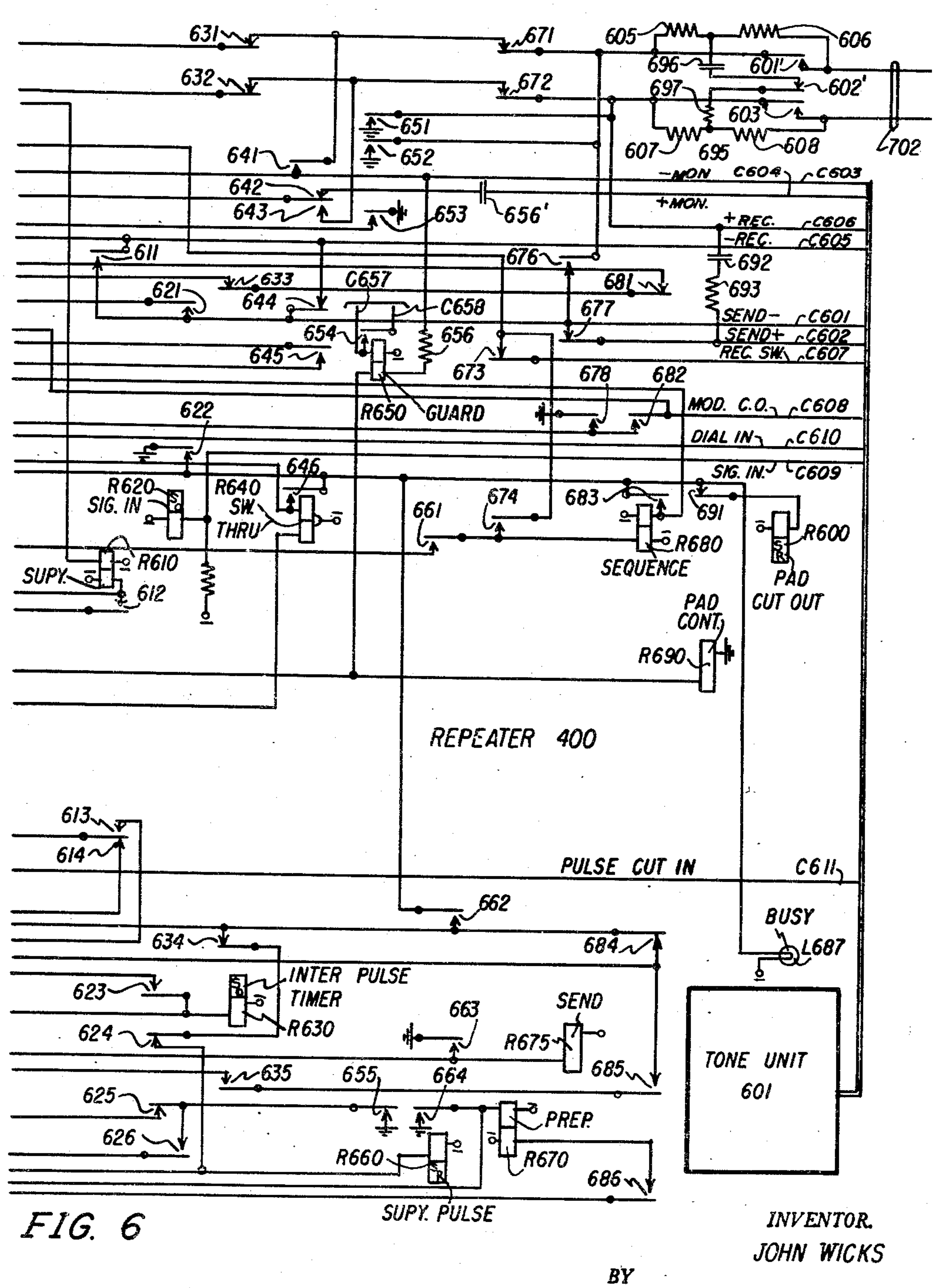
Figure 7:
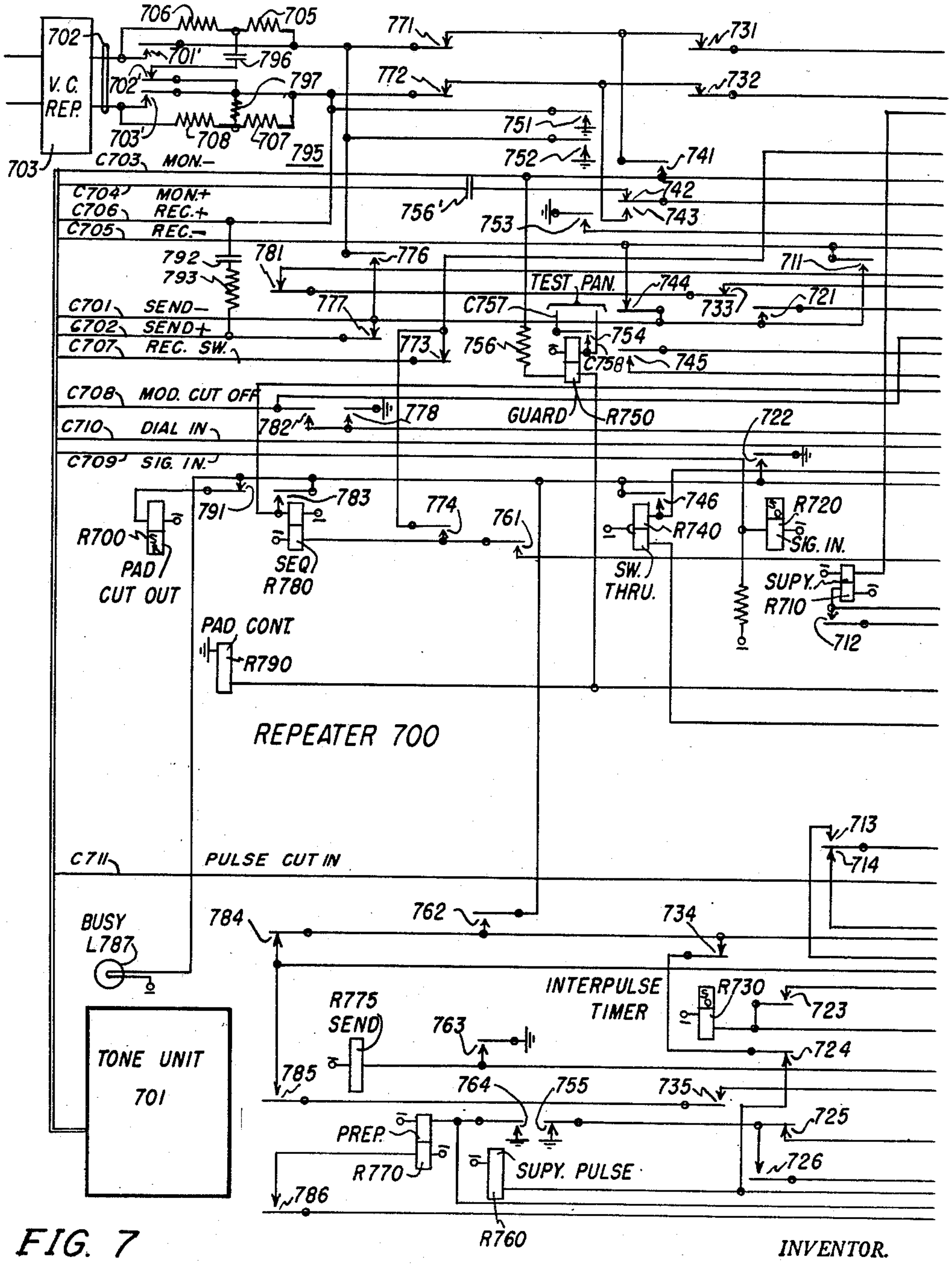
Figure 8:
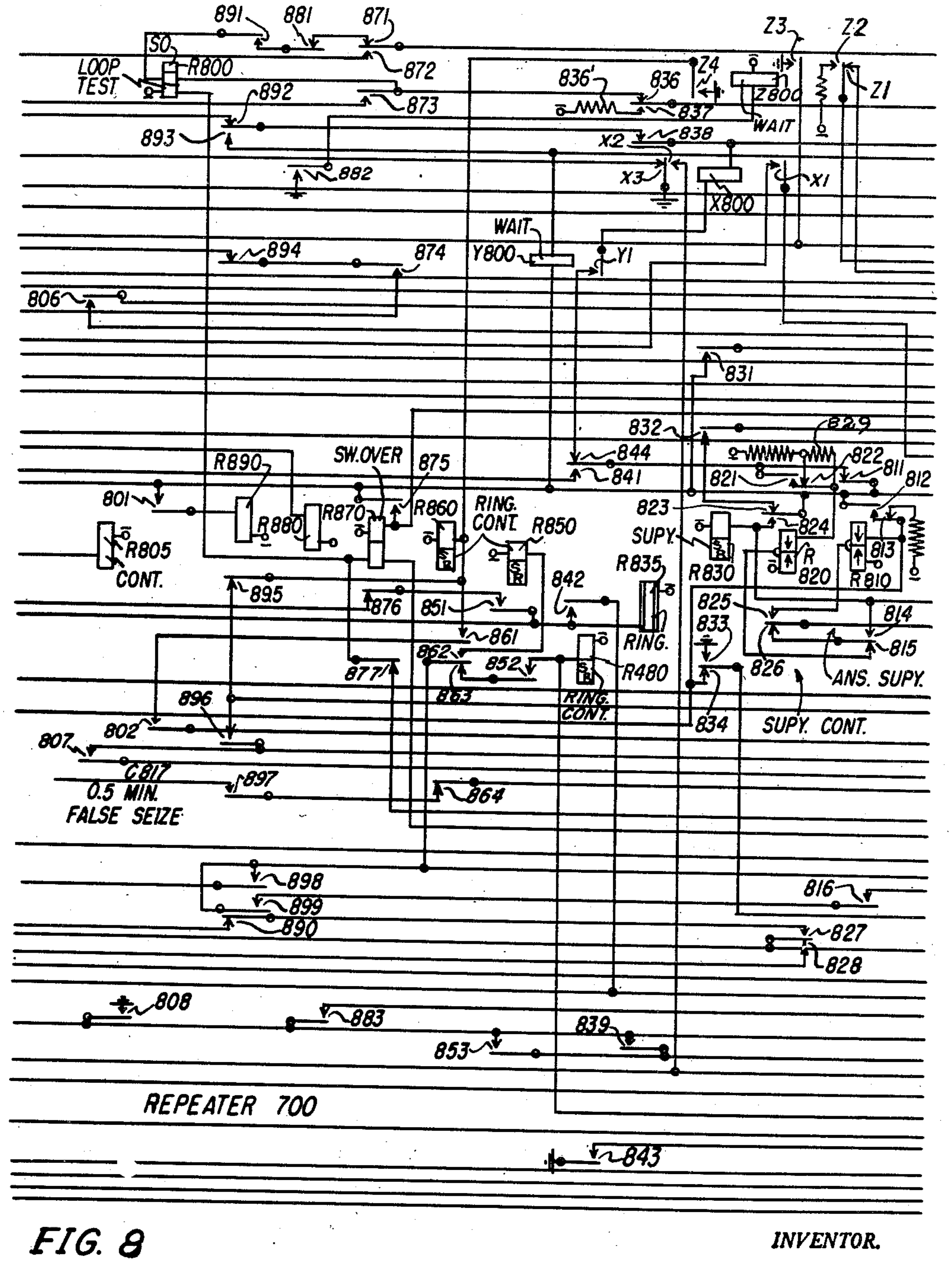
Figure 9:
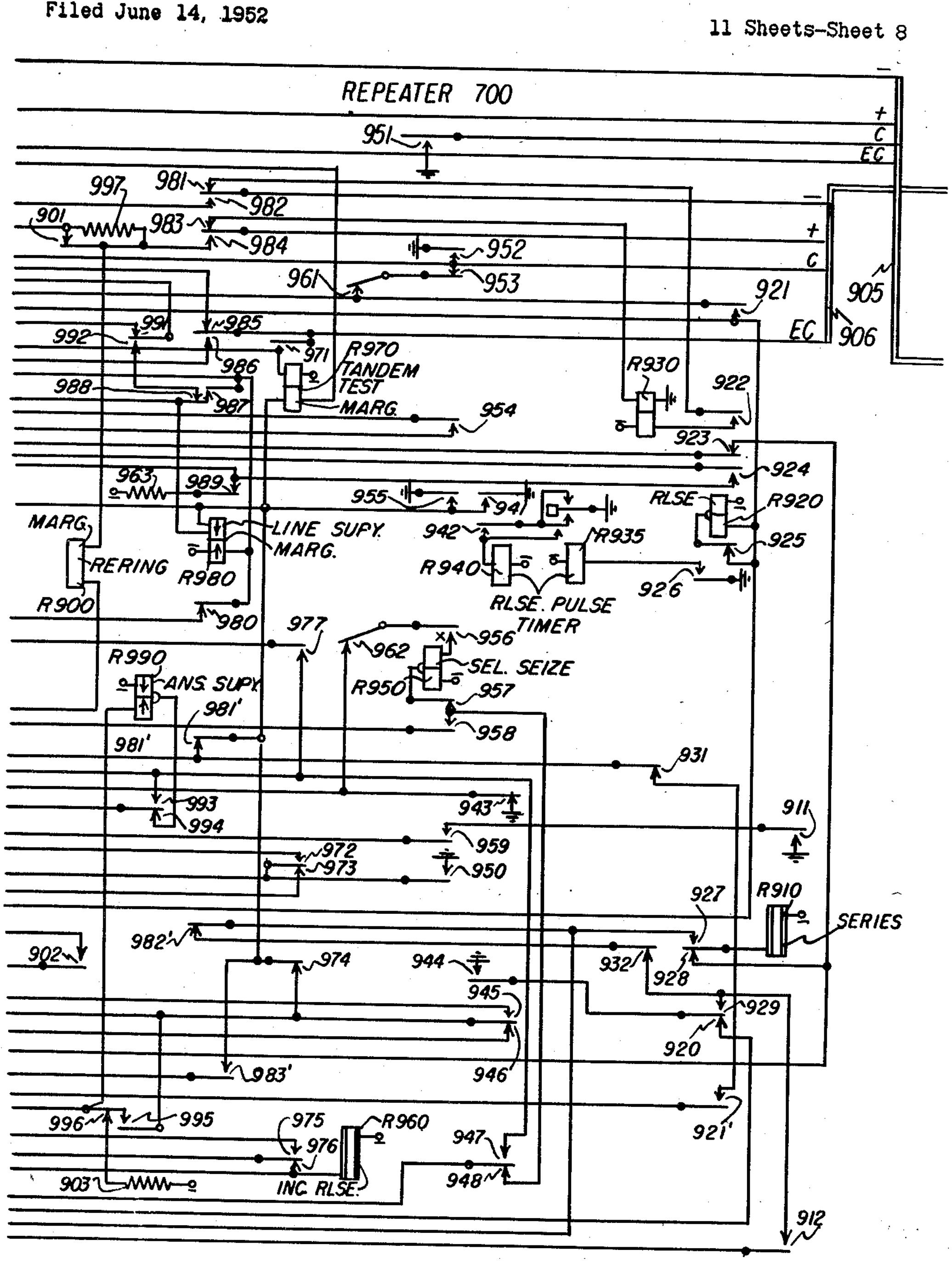

More particularly, Fig. 2 illustrates the general arrangement of toll board equipment, toll line circuits, toll trunk circuits, and switching apparatus provided in one of the offices of the telephone system; Fig. 3 illustrates the details of one of the outgoing toll selectors provided in the one office mentioned; Figs. 4 to 6, inclusive, illustrate the details of one of the repeaters provided in the one office mentioned; Figs. 7 to 9, inclusive, illustrate the details of one of the repeaters incorporated in another of the offices of the telephone system; Fig. 10 illustrates the details of one of the incoming toll selectors provided in the other office mentioned; Fig. 11 illustrates the general arrangement of the toll board equipment, toll line circuits, toll trunk circuits, and switching apparatus provided in the other office mentioned; and Fig. 12 illustrates in skeleton form the details of certain of the relay combinations incorporated in the sender link and the register sender provided in the one office mentioned.

Referring now more particularly to Figs. 2 to 11, inclusive, the telephone system there illustrated serves an area including four offices 10, 20, 30 and 40 arranged in series relation, the offices 20 and 30 being adjacent to each other and respectively adjacent to the offices 10 and 40. The offices 10, 20, 30 and 40 are of the automatic type and comprise toll switching centers. The offices 10 and 40 are provided with equipment of any suitable type; while preferably the offices 20 and 30 are provided with identical equipment. The offices 10 and 20 are interconnected by suitable toll lines 211, etc.; the offices 20 and 30 are interconnected by toll lines 702, etc., of the voice frequency dialing type; and the offices 30 and 40 are interconnected by suitable toll lines 1111, etc. In the office 10, the toll lines 211, etc., are terminated by appropriate toll line circuits, not shown; while in the office 20, the toll lines 211, etc., are terminated by toll line circuits 210, etc., of any suitable type. Similarly, in the office 40, the toll lines 1111, etc., are terminated by appropriate toll line circuits, not shown; while in the office 30, the toll lines 1111, etc., are terminated by toll line circuits 1110, etc., of any suitable type. In the offices 20 and 30, the toll lines 702, etc., are terminated by repeater pairs 400–700 etc., of the voice frequency dialing type.

The office 20 comprises operator switchboard equipment that is preferably of the character of that disclosed in the previously-mentioned Crocker patent and including an operator position 201, a plurality of links 202, etc., a sender link 205, and a register sender 208, each of the links 202, etc., consisting of an answer switch 203, etc., and a call switch 204, etc. Also, in the office 20, there are provided a group of incoming toll selectors 217, etc., and a group of outgoing toll selectors 300, etc. In the arrangement in the office 20, the various links 202, etc., may be selectively connected to the operator position 201; the answer switches 203, etc., of the links 202, etc., have access to the trunks 212, etc., extending from the toll line circuits 210, etc., and to the trunks 216, etc., extending from the inward trunk circuits 214, etc.; while the toll line circuits 210, etc., and the inward trunk circuits 214, etc., are operatively connected to start equipment provided at the operator position 201. The call switches 204, etc., of the links 202, etc., have access to the trunks 220, etc., extending to the outgoing toll selectors 300, etc., and are accessible to the finder 206 provided in the sender link 205, via the associated cables 202C, etc. The sender link 205 is operatively connected to the operator position 201, and the finder 207 thereof has access to the register sender 208. The incoming toll selectors 217, etc., have access to the trunks 215, etc., extending to the inward trunk circuits 214, etc.; while the banks of the call switches 204, etc., and the incoming toll selectors 217, etc., have multiple access to various trunk groups, including the trunks 219, etc., extending to the local switch train and the trunks 213, etc., extending to the toll line circuits 210, etc. The incoming toll selectors 217, etc., are individually connected by the associated trunks 405, etc., to the individual repeaters 400, etc.

Moreover, the toll line circuits 210, etc., are arranged in three groups or levels in the contact banks of the incoming toll selectors 217, etc. (levels 2, 3 and 4), each group comprising ten individual toll line circuits; and the groups of toll line circuits are provided with corresponding level busy relays. Specifically, the toll line circuit 210 terminates in the group of ten in the third level of the incoming toll selectors 217, etc., and is provided with the corresponding level-three busy relay R225. Of course, the group of ten individual toll line circuits, not shown, terminating in the second level of the incoming toll selectors 217, etc., is provided with a level-two busy relay, not shown.

In a similar manner, the repeaters 400, etc., are arranged in three groups or levels in the contact banks of the outgoing toll selectors 300, etc. (levels 6, 7 and 8); each group comprising ten individual repeaters provided with corresponding level busy relays. Specifically, the repeater 400 terminates in the group of ten in the seventh level of the outgoing toll selectors 300, etc., and is provided with the corresponding level-seven busy relay R395. The group of ten individual repeaters, not shown, terminating in the sixth level of the outgoing toll selectors 300, etc., is provided with a level-six busy relay R390, illustrated.

The office 30 also comprises operator switchboard equipment that is preferably of the character of that disclosed in the previously mentioned Crocker patent and including an operator position 1101, a plurality of links 1102, etc., a sender link 1105, and a register sender 1108, each of the links 1102, etc., consisting of an answer switch 1103, etc., and a call switch 1104, etc. Also, in the office 30 there are provided a group of incoming toll selectors 1000, etc., and a group of outgoing toll selectors 1130, etc. In the arrangement in the office 30, the various links 1102, etc., may be selectively connected to the operator position 1101; the answer switches 1103, etc., of the links 1102, etc., have access to the trunks 1112, etc., extending from the toll line circuits 1110, etc., and to the trunks 1116, etc., extending from the inward trunk circuits 1114, etc.; while the toll line circuits 1110, etc., and the inward trunk circuits 1114, etc., are operatively connected to start equipment provided at the operator position 1101. The call switches 1104, etc., of the links 1102 etc. have access to the trunks 1120, etc., extending to the outgoing toll selectors 1130, etc., and are accessible to the finder 1106 provided in the sender link 1105, via the associated cables 1102C, etc. The sender link 1105 is operatively connected to the operator position 1101, and the finder 1107 thereof has access to the register sender 1108. The incoming toll selectors 1000, etc., have access to the trunks 1115, etc., extending to the inward trunk circuits 1114, etc.; while the banks of the call switches 1104, etc., and the incoming toll selectors 1000, etc., have multiple access to various trunk groups, including the trunks 1119, etc., extending to the local switch train and the trunks 1113, etc., extending to the toll line circuits 1110, etc. The incoming toll selectors 1000, etc., are individually connected by the associated trunks 905, etc., to the individual repeaters 700, etc.

Moreover, the toll line circuits 1110, etc., are arranged in three groups or levels in the contact banks of the incoming toll selectors 1000, etc. (levels 2, 3 and 4), each group comprising ten individual toll line circuits; and the groups of toll line circuits are provided with corresponding level busy relays. Specifically, the toll line circuit 1110 terminates in the group of ten in the third level of the incoming toll selectors 1000, etc., and is provided with the corresponding level-three busy relay R1090. The group of ten individual toll line circuits, not shown, terminating in the second level of the incoming toll selectors 1000, etc., is provided with a level-two busy relay R1095.

In a similar manner, the repeaters 700, etc., are arranged in three groups or levels in the contact banks of the outgoing toll selectors 1130, etc. (levels 6, 7 and 8); each group comprising ten individual repeaters provided with corresponding level busy relays. Specifically, the repeater 700 terminates in the group of ten in the seventh level of the outgoing toll selectors 1130, etc., and is provided with the corresponding level-seven busy relay R1125. Of course, the group of ten individual repeaters, not shown, terminating in the sixth level of the outgoing toll selectors 1130, etc., is provided with a level-six busy relay, not shown.

In the office 20, preferably the local switch train, not shown, is of the Strowger type; and each of the repeaters 400, etc., has a tone unit 601, etc., individually associated therewith. Similarly, in the office 30, preferably the local switch train, not shown, is of the Strowger type; and each of the repeaters 700, etc., has a tone unit 701, etc., individually associated therewith.

*Section 2.—The apparatus incorporated in the telephone system*

In the office 20, the toll board equipment is identical to that disclosed in the previously-mentioned Crocker patent, as previously noted; and specifically the operator position 201 may correspond to that shown in Figs. 11, 12, 13, 14 and 16 of the Crocker patent; the answer switch 203 may correspond to that shown in Fig. 6 of the Crocker patent; the call switch 204 may correspond to that shown in Fig. 7 of the Crocker patent; the sender link 205 may correspond to that shown in Fig. 15 of the Crocker patent; and the register-sender 208 may correspond to that shown in Figs. 17, 18, 19, 20 and 21 of the Crocker patent. Similarly, in the office 30, the toll board equipment is identical to that provided in the office 20; and specifically the pieces of apparatus 1101, 1103, 1104, 1105, and 1108 respectively correspond to the previously noted pieces of apparatus 201, 203, 204, 205 and 208.

Preferably, in the offices 20 and 30, the outgoing toll selectors 300, 1130, etc., are identical; the outgoing toll selector 300 comprising, as shown in Fig. 3, a Strowger mechanism 301, including a wiper carriage carrying a main wiper set 302 and a vertical control wiper VW. Associated with the main wiper set 302 are ten vertical levels of contact sets, each level including ten individual contact sets arranged in the rotary direction; and associated with the vertical control wiper VW is an associated vertical control contact bank including ten individual contacts arranged in the corresponding ten levels. Also the Strowger mechanism 301 includes a vertical magnet M303 for driving the wiper carriage step by step in the vertical direction, a rotary magnet M305 for driving the wiper carriage step by step in the rotary direction, and a release magnet M307 for releasing the wiper carriage and for causing it to be returned to its normal rotary and vertical positions. Associated with the wiper carriage are three sets of switch springs S308, S309 and S310 that are operated when the wiper carriage is driven one step in the vertical direction out of its normal vertical position, a set of switch springs S313 that is operated when the wiper carriage is driven to the sixth, seventh and eight levels thereof, and two sets of switch springs S311 and S312 that are operated in the event the wiper carriage is driven eleven steps in the rotary direction away from its normal rotary position.

Also, the outgoing toll selector 300 comprises a relay group including a line relay R320, a release relay R330, a series relay R340, a step relay R350, a changeover relay R360, a pulse delay relay R370, and a switch relay R380. In the arrangement, the Strowger mechanism 301 is capable of both vertical level hunting and rotary contact set hunting; the three levels of trunks extending to the various repeaters 400, etc., being arranged in the sixth, seventh and eighth levels of the contact bank associated with the main wiper set 302, as previously noted. Accordingly, the sixth and seventh vertical contacts associated with the vertical control wiper VW are respectively governed by the individually associated level-six busy relay R390 and level-seven busy relay R395; whereas ground potential is directly applied to the eighth vertical control contact associated with the vertical control wiper VW, since the eighth level of contacts associated with the main wiper set 302 is the last or top level of the three groups of trunks extending to the three groups of repeaters 400, etc.

Preferably in the offices 20 and 30, the incoming toll selectors 217, 1000, etc., are identical; the incoming toll selector 1000 comprising, as shown in Fig. 10, a Strowger mechanism 1001, including a wiper carriage carrying a main wiper set 1002 and a vertical control wiper VW. Associated with the main wiper set 1002 are ten vertical levels of contact sets, each level including ten individual contact sets arranged in the rotary direction; and associated with the vertical control wiper VW is an associated vertical control contact bank including ten individual contacts arranged in the corresponding ten levels. Also, the Strowger mechanism 1001 includes a vertical magnet M1003 for driving the wiper carriage step by step in the vertical direction, a rotary magnet M1005 for driving the wiper carriage step by step in the rotary direction, and a release magnet M1007 for releasing the wiper carriage and for causing it to be returned to its normal rotary and vertical positions. Associated with the wiper carriage are three sets of switch springs S1008, S1009 and S1010 that are operated when the wiper carriage is driven one step in the vertical direction out of its normal vertical position, a set of switch springs S1013 that is operated when the wiper carriage is driven to the second, third and fourth levels thereof, and two sets of switch springs S1011 and S1012 that are operated in the event the wiper carriage is driven eleven steps in the rotary direction away from its normal rotary position.

Also, the incoming toll selector 1000 comprises a relay group including a line relay R1020, a release relay R1030, a series relay R1040, a step relay R1050, a changeover relay R1060, a pulse delay relay R1070, and a switch relay R1080. In the arrangement, the Strowger mechanism 1001 is capable of both vertical level hunting and rotary contact set hunting; the three levels of trunks extending to the various toll line circuits 1110, etc., being arranged in the second, third and fourth levels of the contact bank associated with the main wiper set 1002, as previously noted. Accordingly, the second and third vertical control contacts associated with the vertical control wiper VW are respectively governed by the individually associated level-two busy relay R1095 and level-three busy relay R1090; whereas ground potential is directly applied to the fourth vertical control contact associated with the vertical control wiper VW, since the fourth level of contacts associated with the main wiper set 1002 is the last or top level of the three groups of trunks extending to the three groups of toll line circuits 1110, etc.

The repeaters 400, etc., are identical; and preferably these repeaters are substantially identical to the repeater disclosed in Figs. 4 to 6, inclusive, of U. S. Patent No. 2,517,516, granted on August 1, 1950 to John Wicks and Otho D. Grandstaff. Specifically, the repeater 400 comprises, as shown in Figs. 4 to 6, inclusive, a relay group including a series relay R410, a release relay R420, a line relay R430, two release pulse timer relays R435 and R440, a selector seize relay R450, an incoming release relay R460, a tandem test relay R470, a line supervisory relay R480, an answer supervisory relay R490, a re-ring relay R400, an answer supervisory relay R510, a supervisory control relay R520, a supervisory relay R530, a ring relay R535, three ring control relays R540, R550, and R560, a switchover relay R570, a dial-in relay R580, a control relay R590, a loop test relay R500, a control relay R505, three wait relays X500, Y500 and Z500, a supervisory relay R610, a signal-in relay R620, an interpulse timer relay R630, a switchthrough relay R640, a guard relay R650, a supervisory pulse relay R660, a prepare relay R670, a send relay R675, a sequence relay R680, a pad control relay R690 and a pad cutout relay R600, as well as a toll pad 695. Specifically, the connection and arrangement of the relay group in the repeater 400 differ from that incorporated in the repeater disclosed in Figs. 4 to 6, inclusive, of the previously mentioned Wicks and Grandstaff patent in the inclusion of the three wait relays X500, Y500 and Z500 that are employed for a purpose more fully explained hereinafter.

The tone units 601, etc., are identical; and the tone unit 601 is connected and arranged in the manner of the tone unit disclosed in U. S. Patent No. 2,482,478, granted on September 20, 1949, to Otho D. Grandstaff. For example, the tone unit 601, indicated in Fig. 6, comprises both a sender and a receiver of unmodulated audio frequency signals and fixed frequency modulated audio frequency carrier signals. Specifically, the tone unit 601 is adapted to send and to receive unmodulated 1000 cycle audio frequency signals, as well as to send and to receive 60 cycle modulated 1000 cycle audio frequency carrier signals; which signals are utilized for the purpose of digit send control, seizure control, supervisory control and release control, as explained more fully hereinafter. Also, the tone unit 601 comprises a relay group, not shown, including a modulation cut-off relay, a receive switch relay, a pulse cut-in relay, an impulse-in relay and a signal-in relay; as well as a group of conductors extending to the associated repeater 400 and including a sending − conductor C601, a sending + conductor C602, a monitoring − conductor C603, a monitoring + conductor C604, a receiving − conductor C605, a receiving + conductor C606, a receiving switch conductor C607, a modulation cut-off conductor C608, a signal-in conductor C609, a dial-in conductor C610 and a pulse cut-in conductor C611. Finally, the tone unit 601 comprises a 60 cycle generator and a 1000 cycle generator, as well as a vacuum tube relay circuit, not shown.

The repeaters 700, etc., are identical; and preferably these repeaters are substantially identical to the repeater disclosed in Figs. 4 to 6, inclusive, of the previously mentioned patent of John Wicks and Otho D. Grandstaff. Specifically, the repeater 700 comprises, as shown in Figs. 7 to 9, inclusive, a relay group including a series relay R910, a release relay R920, a line relay R930, two release pulse timer relays R935 and R940, a selector seize relay R950, an incoming release relay R960, a tandem test relay R970, a line supervisory relay R980, an answer supervisory relay R990, a re-ring relay R900, an answer supervisory relay R810, a supervisory control relay R820, a supervisory relay R830, a ring relay R835, three ring control relays R840, R850 and R860, a switch-over relay R870, a dial-in relay R880, a control relay R890, a loop test relay R800, a control relay R895, three wait relays X800, Y800 and Z800, a supervisory relay R710, a signal-in relay R720, an interpulse timer relay R730, a switchthrough relay R740, a guard relay R750, a supervisory pulse relay R760, a prepare relay R770, a send relay R775, a sequence relay R780, a pad control relay R790 and a pad cutout relay R703, as well as a toll pad 795. Specifically, the connection and arrangement of the relay group in the repeater 700 differ from that incorporated in the repeater disclosed in Figs. 4 to 6, inclusive, of the previously mentioned Wicks and Grandstaff patent in the inclusion of the three wait relays X800, Y800 and Z800 that are employed for a purpose more fully explained hereinafter.

The tone units 701, etc., are identical; and the tone unit 701 is connected and arranged in the manner of the tone unit disclosed in the previously mentioned patent of Otho D. Grandstaff. For example, the tone unit 701, indicated in Fig. 7, comprises both a sender and a receiver of unmodulated audio frequency signals and fixed frequency modulated audio frequency carrier signals. Specifically, the tone unit 701 is adapted to send and to receive unmodulated 1000 cycle audio frequency signals, as well as to send and to receive 60 cycle modulated 1000 cycle audio frequency carrier signals; which signals are utilized for the purpose of digit send control, seizure control, supervisory control and release control, as explained more fully hereinafter. Also, the tone unit 701 comprises a relay group, not shown, including a modulation cutoff relay, a receive switch relay, a pulse cut-in relay, an impulse-in relay and a signal-in relay; as well as a group of conductors extending to the associated repeater 700 and including a sending — conductor C701, a sending + conductor C702, a monitoring — conductor C703, a monitoring + conductor C704, a receiving — conductor C705, a receiving + conductor C706, a receiving switch conductor C707, a modulation cutoff conductor C708, a signal-in conductor C709, a dial-in conductor C710 and a pulse cut-in conductor C711. Finally, the tone unit 701 comprises a 60 cycle generator and a 1000 cycle generator, as well as a vacuum tube relay circuit, not shown.

Further, in the offices 20 and 40, the toll line circuits 210, 1110, etc., may be of any suitable type; and it is specifically noted that the toll line 702 interconnecting the repeaters 400 and 700 respectively arranged in the offices 20 and 30 incorporates suitable voice current repeaters 703 of the conventional vacuum tube type.

As illustrated in Fig. 12, the sender link 205 comprises the finders 206 and 207 of the rotary type and a relay group, several of the individual relays being indicated. Specifically, in the sender link 205, the pulse relay R1210 and the pulse delay relay R1220 are indicated. Also, the register sender 208 comprises a relay group, several of the individual relays being indicated. Specifically, in the register sender 208, the pulse delay relay R1230 and the restart relay R1240 are indicated.

A better understanding of the connection and arrangement of the apparatus incorporated in the telephone system will be facilitated from a consideration of the extension of calls involving various ones of the offices 10, 20, 30 and 40.

*Section 3.—Extension of a toll call from the office 10 to the toll switchboard in the office 20 and further extension of the toll call therefrom*

Considering now the extension of a toll call from the office 10 to the toll switchboard in the office 20, it may be assumed that the operator at the position 201 has preselected for use the link 202 and has operated the talk key thereof conditioning the answer switch 203 for subsequent operation. It also may be assumed that the toll call from the office 10 is routed therefrom in any suitable manner over the toll line 211 to the toll line circuit 210, whereby the toll line circuit 210 effects the control of the start equipment at the operator position 201 so that operation of the answer switch 203 is initiated. More particularly, the answer switch 203 operates to find the trunk 212 extending from the calling toll line circuit 210 so as to complete a connection to the operator position 201 via the answer switch 203 of the link 202. The operator at the position 201 converses over the toll connection and learns the required further extension of the toll call in the usual manner.

Considering now the further extension of the toll call that has been answered at the operator position 201, without reference to the particular destination thereof, routing of the toll call to the operator position 201 effected operation of the sender link 205, whereby the finder 207 found the register sender 208, and the finder 206 found the cable 202C extending to the call switch 204 comprising a portion of the link 202. Upon learning the destination of the toll call, the operator at the position 201 operates her keyset in accordance with the required digits. Specifically, the individual digit keys of the keyset at the operator position 201 are sequentially operated; and finally the send disconnect key thereof is operated; whereby the digits mentioned are registered in the register sender 208 and the register sender 208 is conditioned automatically to release following the release of the several digits mentioned. Specifically, the first digit registered in the register sender 208 is sent therefrom via the finder 207 to the sender link 205 and repeated from the sender link 205 via the finder 206 and the cable 202C to the call switch 204 effecting operation of the call switch 204 to the corresponding level of outgoing trunks. The call switch 204 then operates automatically to select an idle trunk in the previously selected level and switches through so that the second digit sent from the register sender 208 and repeated from the sender link 205 proceeds over the selected trunk. The second and succeeding digits sent from the register sender 208 are repeated from the sender link 205 over the trunk that is selected by the call switch 204 in order to bring about the setting up of the connection to the required destination.

After the toll call has been thus extended, the sender link 205 and the register sender 208 are automatically released; and when the call is subsequently answered, a three-way connection is completed involving the toll line 211, the operator position 201, and the called trunk selected by the call switch 204. The operator at the position 201 then restores the talk key of the link 202 to provide a private conversation between the calling end of the connection and the called end of the connection in the usual manner. At this time, both the calling end of the connection and the called end of the connection have access again to the operator position 201 by virtue of switchhook supervision and may thus signal the operator so that the operator may again operate the talk key of the link 202 and thus re-enter the connection in the usual manner. At the conclusion of the connection, both the calling end of the connection and the called end of the connection render disconnect supervision to the respective answer switch 203 and the call switch 204; whereby the operator at the position 201 may reoperate the talk key of the link 202 and challenge the connection in order to determine the disconnections mentioned. At this time, the operator at the position 201 operates her release keys bringing about the desired release of the respective answer switch 203 and the call switch 204. The release of the answer switch 203 brings about the release of the toll line circuit 210 and the remainder of the apparatus in the calling end of the connection; while the release of the call switch 204 brings about the release of the apparatus in the called end of the connection.

Reconsidering the extension of the toll call from the operator position 201, the called connection may involve one of the outgoing toll selectors 300, etc., assuming that the first digit registered in the register sender 208 is the digit 4 causing the call switch 204 to select the corresponding fourth level in which the trunks 220, etc., extending to the outgoing toll selectors 300, etc., are terminated. In this case, the call switch 204 may operate automatically to select the particular trunk 220 extending to the outgoing toll selector 300, whereby the call switch 204, upon switching through, extends the loop circuit from the sender link 205 to the + and — conductors of the trunk 220 and effects the application of ground potential to the C conductor of the trunk 220. In passing, it is noted that the trunk 220 is marked as idle to the call switch 204 by virtue of the application of battery potential upon the C conductor thereof via a path including the set of switch springs S310 and the upper winding of the series relay R340. The application of ground potential to the C conductor of the trunk 220 completes a circuit, including the contacts 381 and 383, for energizing in series the upper and lower windings of the line relay R320 in the outgoing toll selector 300, via the — and + conductors of the trunk 220 from the loop circuit in the sender link 205, whereby the line relay R320 is operated. Upon operating, the line relay R320 completes, at the contacts 321, a circuit, including the contacts 388, for operating the release relay R330. Upon operating, the release relay R330 completes, at the contacts 333, a local path for applying ground potential to the C conductor of the trunk 220 since ground potential in the call switch 204 is removed from the C conductor of the trunk 220 shortly following the switch through operation of the call switch 204. Also the application of ground potential to the C conductor of the trunk 220 completes a circuit, including the set of switch springs S310, for energizing the upper winding of the series relay R340 in order to cause the latter relay to operate. At this time, the outgoing toll selector 300 has been seized and is in readiness to respond to the next digit that is sent from the register sender 208 and repeated from the sender link 205.

As the next digit is received over the — and + conductors of the trunk 220, the line relay R320 follows. Each time the line relay R320 restores and then reoperates, it interrupts and then recompletes, at the contacts 321, the circuit for energizing the winding of the release relay R330, whereby the latter relay remains at its operated position during impulsing as it is of the slow-to-release type. Also each time the line relay R320 restores and then reoperates, it completes and then interrupts, at the contacts 322, a circuit, including the contacts 388 and 334, for energizing the vertical magnet M303 and a multiple circuit, also including the contacts 343, for energizing the lower winding of the series relay R340. Accordingly, the impulses of the present digit are transmitted by the line relay R320, at the contacts 322, both to the vertical magnet M303 and to the lower winding of the series relay R340, thereby to effect repeated operation and restoration of the vertical magnet M303 and to retain the series relay R340 in its operated position during impulsing, the latter relay being of the slow-to-release type.

Each time the vertical magnet M303 operates, it drives the wiper carriage of the Strowger mechanism 301 one step in the vertical direction; and when the wiper carriage is driven out of its normal vertical position, the sets of switch springs S308, S309 and S310 are operated. More particularly, the set of switch springs S308 is closed to prepare a circuit traced hereinafter for operating the release magnet M307; and the set of switch springs S310 is opened to interrupt the previously traced circuit for energizing the upper winding of the series relay R340. The set of switch springs S309 is closed so as to complete a circuit, including the contacts 388, 336, and 345, for operating the step relay R350. Upon operating the step relay R350 interrupts, at the contacts 351, a further point in an alternative circuit traced hereinafter, for operating the vertical magnet M303 and depending upon whether a vertical level hunting operation is involved in the present selection of a level by the main wiper set 302 of the Strowger mechanism 301.

The subsequent operation of the outgoing toll selector 300 depends upon whether the present selection involves a vertical level hunting operation of the Strowger mechanism 301, and for purposes of illustration, it may be assumed that this operation is not involved, which condition prevails when the present digit has certain values, such, for example, as 2. In this case, at the conclusion of the digit 2, the main wiper set 302 of the Strowger mechanism 301 has selected the second level in the associated contact bank, and the vertical control wiper VW has selected the second contact in the associated vertical control contact bank completing a path, including the contacts 345, the set of switch springs S309 and the contacts 336 and 388, for short-circuiting the upper winding of the changeover relay R360. Accordingly, at the conclusion of the digit 2, the line relay R320 is retained in its operated position retaining operated the release relay R330, whereby the series relay R340 restores shortly thereafter, it being of the slow-to-release type. Upon restoring, the series relay R340 interrupts, at the contacts 345, the previously traced path for short-circuiting the upper winding of the changeover relay R360 and the winding, whereby the upper winding of the changeover relay R360 and the winding of the step relay R350 are energized in series relation in order to retain the step relay R350 in its operated position and to cause the changeover relay R360 to operate shortly thereafter, the latter relay being of the slow-to-operate type. Upon operating, the changeover relay R360 completes, at the contacts 361, a holding circuit, including the contacts 346, the set of switch springs S309 and the contacts 336 and 388, for energizing the lower winding thereof; and completes, at the contacts 362, a circuit, including the contacts 306 and 346, the set of switch springs S309 and the contacts 336 and 388, for operating the rotary magnet M305. Upon operating, the rotary magnet M305 drives the wiper carriage of the Strowger mechanism one step in the rotary direction away from its normal rotary position; and interrupts, at the contacts 306, its operating circuit. Accordingly, the rotary magnet M305 operates buzzer-fashion causing the C wiper of the main wiper set 302 to test successive trunks in the previously selected second level, if necessary, in order to select an idle trunk therein. At this time, the lower winding of the switch relay R380 is energized via a circuit, including the contacts 332, of the operated release relay R330, rendering the switch relay R380 fast-to-operate when the upper winding thereof is energized. Also, the upper winding of the switch relay R380 is connected between ground potential, at the contacts 333, and the C wiper of the main wiper set 302, the path also including the contacts 331 and 342. Accordingly, each time a busy trunk in the previously selected second level is tested by the main wiper set 302, the upper winding of the switch relay R380 is short-circuited by virtue of the application of ground potential to the C conductor of the trunk mentioned.

However, when the main wiper set 302 encounters an idle trunk in the previously selected second level, battery potential appearing upon the C conductor thereof completes a circuit substantially identical to that previously traced for energizing the upper winding of the switch relay R380 causing the latter relay to operate quickly. Also, when the wiper carriage of the Strowger mechanism 301 is driven one step in the rotary direction away from its normal rotary position, the vertical control wiper VW disengages the second grounded contact in the associated vertical control bank interrupting the previously traced circuit for energizing the upper winding of the changeover relay R360 in series with the winding of the step relay R350, whereby the step relay R350 restores, but the changeover relay R360 is retained in its operated position by virtue of the completed holding circuit for energizing the lower winding thereof.

Upon operating, the switch relay R380 interrupts, at the contacts 388, the above-traced circuit for operating the rotary magnet M305 so as to arrest further rotation of the wiper carriage of the Strowger mechanism 301 in the rotary direction. Also, the switch relay R380 completes, at the contacts 386, a holding circuit, including the contacts 333, for energizing the intermediate winding thereof; completes, at the contacts 387, a connection between the EC conductor of the trunk 220 and the EC wiper of the main wiper set 302; completes, at the contacts 385, a direct path, including the contacts 342, for applying ground potential to the C wiper of the main wiper set 302; interrupts, at the contacts 381 and 383, the loop circuit extending from the sender link 205 to the line relay R320; and completes, at the contacts 382 and 384, a direct connection between the — and + conductors of the trunk 220 and the — and + wipers of the main wiper set 302.

Further, the switch relay R380 interrupts, at the contacts 388, the holding circuit, for energizing the lower winding of the changeover relay R360 so as to cause the latter relay to restore. When the above-traced loop circuit to the line relay R320 is interrupted, the latter relay restores; and shortly after the operation of the switch relay R380, the release relay R330 restores, the latter relay being of the slow-to-release type. Upon restoring, the release relay R330 interrupts, at the contacts 333 and 331, points in the initial operating circuit for energizing the upper winding of the switch relay R380; and interrupts, at the contacts 332, the initial circuit for energizing the lower polarizing winding of the switch relay R380. However, the switch relay R380 is retained in its operated position by virtue of the completed holding circuit for energizing the intermediate winding thereof since ground potential is retained upon the C conductor of the trunk 220 in the sender link 205 at this time; and the operated switch relay R380 forwards ground potential, at the contacts 385, via the contacts 342, to the C wiper of the wiper set 302. Accordingly, at this time, further sending operation of the register sender 208 takes place, the next digit being transmitted over the — and + conductors of the trunk 220 and consequently over the — and + wipers of the main wiper set 302, since the outgoing toll selector 300 occupies its switched-through position at this time.

Reconsidering the operation of the outgoing toll selector 300, in the event the digit transmitted from the register sender 208 to the line relay R320 in the outgoing toll selector 300 comprises the digit 6, a vertical level hunting operation may take place by the Strowger mechanism 301 at the conclusion of the digit 6, depending upon the idle or busy condition of the ten individual trunks in the corresponding selected sixth level. More particularly, when the main wiper set 302 of the Strowger mechanism 301 is driven in the vetrical direction six, seven or eight steps from its normal vertical position, the set of switch springs S313 is operated to prepare a circuit for operating the pulse delay relay R370, whereby this circuit is completed, at the contacts 346, incident to the restoration of the series relay R340 shortly following the conclusion of the digit 6. The circuit mentioned also includes the set of switch springs S309 and the contacts 336 and 388; and upon operating, the pulse delay relay R370 completes, at the contacts 371, a path for applying battery potential via the resistor 313 to the EC conductor of the trunk 220; which application of resistance battery potential to the EC conductor mentioned positively prevents operation of the register sender 208 at this time to send the succeeding digit, as explained more fully hereinafter. Moreover in the event there is an idle trunk in the selected sixth level, the level-six busy relay R390 occupies its restored position and the application of ground potential, at the contacts 391, to the sixth contact in the vertical control contact bank engaged by the vertical control wiper VW, at this time, brings about operation of the changeover relay R360 incident to the restoration of the series relay R310, whereby searching in the rotary direction for an idle trunk in the previously selected sixth level takes place by the main wiper set 302, in a manner substantially identical to that previously explained.

However, at this time, in the event all of the trunks in the sixth level are busy, a chain circuit is completed for operating the level-six busy relay R390 so as to interrupt, at the contacts 391 thereof, the normal path for applying ground potential to the sixth contact in the vertical control contact bank that is engaged by the vertical control wiper VW, whereby the series circuit for energizing the upper winding of the changeover relay R360 and the winding of the step relay R350 incident to the restoration of the series relay R340 is not completed since no ground potential appears upon the vertical control wiper VW. Accordingly, in this case, upon restoring the series relay R340 interrupts, at the contacts 345, the circuit for retaining operated the step relay R350, whereby the latter relay upon restoring completes, at the contacts 351, an alternative circuit, including the contacts 344, 363 and 346, the set of switch springs S309 and the contacts 336 and 388, for reoperating the vertical magnet M303. Upon reoperating, the vertical magnet M303 drives the wiper carriage an additional step in the vertical direction; and recompletes, at the contacts 304, an alternative circuit, including the set of switch springs S309 and the contacts 336 and 388, for reoperating the step relay R350. Upon reoperating, the step relay R350 interrupts, at the contacts 351, the alternative circuit for operating the vertical magnet M303 whereby the vertical magnet M303 restores to interrupt, at the contacts 304, the circuit for retaining operated the step relay R350. Accordingly, the vertical magnet M303 and the step relay R350 interact, in the manner described above, to drive the wiper carriage of the Strowger mechanism 301 from the sixth level into the seventh level, whereby further interaction between the relays mentioned depends upon whether there is an idle trunk in the selected seventh level, which circumstances is dependent upon the restored or operated position of the level-seven busy relay R395. More particularly, in the event there is an idle trunk in the seventh level mentioned, the level-seven busy relay R395 occupies its restored position causing ground potential, at the contacts 396, to be applied to the seventh contact in the vertical control contact bank now engaged by the vertical control wiper VW, whereby the step relay R350 is retained in its operated position and the changeover relay R360 is operated shortly thereafter, in the manner previously explained.

However, in the event there is no idle trunk in the seventh level, the level-seven busy relay R395 occupies its operated position interrupting, at the contacts 396, the path for applying ground potential to the seventh contact in the vertical control contact bank now engaged by the vertical control wiper VW; whereby the step relay R350 and the vertical magnet M303 again interact, in the manner described above, so that the main wiper set 302 is driven to the eighth level. Since ground potential is directly applied to the eighth contact in the vertical control contact bank, the vertical control wiper VW engaging the contact noted retains the step relay R350 in its operated position and effects operation of the changeover relay R360 shortly thereafter, in the manner described above, regardless of whether there is, in fact, an idle trunk in the top or eighth level of the group of trunks previously selected.

At this time, the changeover relay R360 operates bringing about operation of the rotary magnet M305 and the consequent driving of the wiper carriage of the Strowger mechanism 301 in the rotary direction in search of an idle trunk in the eighth level, which searching operation is the same as that previously described. Thus, it will be understood that the main wiper set 302 may be operated in the rotary direction to select an idle trunk in the sixth, seventh or eighth levels depending upon whether the vertical level hunting operation of the main wiper set 302 takes place, as described above; and in any case, when the main wiper set 302 selects an idle one of the trunks in the previously selected sixth, seventh or eighth levels, the switch relay R380 is operated bringing about the restoration of the changeover relay R360, the line relay R320 and the release relay R330, in the manner previously explained. Also in this case, upon operating the switch relay R380 interrupts, at the contacts 388, the multiple circuit for energizing the winding of the pulse delay relay R370 so as to cause the latter relay to restore shortly thereafter, it being of the slow-to-release type. Upon restoring, the pulse delay relay R370 interrupts, at the contacts 371, the path for applying resistance battery potential to the EC conductor of the trunk 220, whereby further sending operation of the register sender 208 takes place, the next digit being transmitted over the − and + conductors of the trunk 220 and consequently over the − and + wipers of the main wiper set 302, since the outgoing toll selector 300 occupies its switched through position at this time.

The manner in which the pulse delay relay R370 brings about withholding of sending of the next digit from the register sender 208 may be best understood by reference to Fig. 12. More particularly, when the pulse delay relay R370 operates to apply the resistance battery potential to the EC conductor of the trunk 220, the potential mentioned is returned via the EC conductor of the cable 202C completing a circuit for operating the pulse delay relay R1220 in the sender link 205. Upon operating, the pulse delay relay R1220 completes, at the contacts 1221, a local holding circuit for retaining operated the pulse relay R1210; and the operated pulse relay R1210 retains completed, at the contacts 1211, a direct bridge circuit across the − and + conductors in the cable 202C so as to retain a pulsing bridge thereacross. Also, upon operating, the pulse delay relay R1220 interrupts, at the contacts 1222, the normal series circuit for energizing the winding of the pulse relay R1210 in the sender link 205 and the winding of the pulse delay relay R1230 in the register sender 208. Accordingly, the pulse delay relay R1230 restores completing, at the contacts 1231, a direct path for short-circuiting the lower winding of the restart relay R1240 in the register sender 208, whereby it is now impossible to reoperate the restart relay R1240 to bring about the sending of the next digit from the register sender 208 so that further sending of digits from the register sender 208 is blocked or arrested at this time.

Subsequently, when the pulse delay relay R370 in the outgoing toll selector 300 restores, in the manner previously explained, resistance battery potential is removed from the EC conductor of the trunk 220 and consequently from the EC conductor of the cable 202C interrupting the circuit for retaining operated the pulse delay relay R1220 in the sender link 205. The pulse delay relay R1220 then restores interrupting, at the contacts

1221, the local holding circuit for retaining operated the pulse relay R1210; and recompleting at the contacts 1222, the normal circuit between the pulse relay R1210 in the sender link 205 and the pulse delay relay R1230 in the register sender 208. Accordingly, at this time, the pulse relay R1210 is retained in its operated position and the pulse delay relay R1230 is reoperated. Upon reoperating, the pulse delay relay R1230 in the register sender 208 interrupts, at the contacts 1231, the path for short-circuiting the lower winding of the restart relay R1240, whereby further operation of the register sender 208 to send the next and succeeding digits registered therein may proceed. In passing, it is noted that in the operation of the register sender 208, the intermediate one of the interrupter relays indicated controls, at its contacts, the circuit between the pulse delay relay R1230 in the register sender 208 and the pulse relay R1210 in the sender link 205, so that the pulse relay R1210 may be restored and reoperated repeatedly in accordance with the impulses of a digit that is sent from the register sender 208; whereby each time the pulse relay R1210 restores and then reoperates, it interrupts and then recompletes, at the contacts 1211, the local bridging or impulsing path across the − and + conductors of the cable 202C, thereby repeating the impulses of the digit over the cable 202C.

Continuing now with the operation of the outgoing toll selector 300, it may occur that all of the trunks in the sixth, seventh and eighth levels thereof are busy, whereby the vertical trunk hunting operation of the main wiper set 302 takes place, followed by the rotary contact set hunting operation thereof in the eighth level, whereby the rotary magnet M305 is operated to drive the wiper carriage eleven steps in the rotary direction away from its normal rotary position so as to actuate the sets of switch springs S311 and S312. When the set of switch springs S312 is operated into engagement, a circuit, including the contacts 333, is completed for energizing the upper winding of the series relay R340 in series with the upper winding of the switch relay R380, thereby to cause the relays mentioned to operate. Upon operating, the switch relay R380 interrupts, at the contacts 388, the circuit for operating the rotary magnet M305 and the multiple circuits for retaining operated the changeover relay R360 and the pulse delay relay R370. Also the switch relay R380 interrupts, at the contacts 381 and 383, the circuit for retaining operated the line relay R320, whereby the latter relay brings about the restoration of the release relay R330 shortly thereafter. At this time, ground potential in the sender link 205 is supplied to the C conductor of the trunk 220 retaining operated the switch relay R380 and the series relay R340, the upper winding of the series relay R340 being energized in series with the upper winding of the switch relay R380 via a circuit, including the set of switch springs S312; and the intermediate winding of the switch relay R380 being energized via a circuit, including the grounded C conductor of the trunk 220 and the contacts 386. Also the operated set of switch springs S311 brings about the connection of the 60 I. P. M. conductor 314 to the EC conductor of the trunk 220 so as to cause characteristic flashing of the call supervisiory lamp, not shown, incorporated in the call switch 204. Specifically, the flashing of the call supervisory lamp mentioned in the call switch 204 at the 60 impulses per minute indicates to the operator at the position 201 that one of the elements of the outgoing toll switch train, the outgoing toll selector 300 in the present instance, has encountered an all-trunks-busy condition, whereby the outgoing toll call has not been extended from the office 20. The operator at the position 201 then effects the release of the outgoing toll switch train including the call switch 204, and also the release of the register link 205 and the register sender 208. Incident to the release of the call switch 204, ground potential is removed from the C conductor of the trunk 220 bringing about the restoration of the switch relay R380 in the outgoing toll selector 300.

Upon restoring, the switch relay R380 completes, at the contacts 388, a circuit, including the contacts 322 and 335, and the set of switch springs S308 for operating the release magnet M307; whereby the wiper carriage of the Strowger mechanism 301 is released and returned to its normal rotary and vertical positions restoring the sets of switch springs S308, S309, S310, S311, S312 and S313. Specifically, the set of switch springs S308 is actuated into disengagement to interrupt the operating circuit of the release magnet M307. At this time, the outgoing switch train, including the outgoing toll selector 300, is completely released.

*Section 4.—Extension of a toll call from the toll switchboard in the office 20 to the toll switchboard in the office 30*

Considering now with the extension of a toll call from the toll switchboard in the office 20 to the toll switchboard in the office 30, the operator at the position 201 may again employ the link 202 illustrated; and in this case, the series of digits 4, 6 and 0 are registered in the register sender 208 employing the keyset, previously mentioned. In this case, the call switch 204 responds to the first digit 4 to select the group of trunks, including the trunk 220, and then operates automatically to select an idle trunk in the group mentioned; for example, the call switch 204 may select the particular trunk 220, bringing about the seizure of the outgoing toll selector 300, in the manner described in Section 3. The outgoing toll selector 300 responds to the second digit 6 to select the lowermost level of the subgroup of trunks extending to the repeaters 400, etc., then operates automatically to select the lowermost one of the three levels having an idle trunk therein, and then operates automatically to select an idle trunk in the previously selected level, in the manner described in Section 3. For instance, the outgoing toll selector 300 may select the particular trunk 406 in the seventh level extending to the repeater 400, the trunk 406 being marked as idle by the presence of battery potential upon the C conductor thereof, the path mentioned extending from battery potential by way of the upper winding of the release relay R420 in the repeater 400, the contacts 425, 633, 681, 461 and 453 to the C conductor of the trunk 406. During the time interval that the outgoing toll selector 300 is hunting in the vertical direction for the associated seventh level of trunks and is hunting in the rotary direction for the idle trunk 406 in the selected level, the pulse delay relay R370 therein occupies its operated position applying resistance battery potential to the EC conductor of the trunk 220 so as to delay the sending operation of the register sender 208, in the manner explained in Section 3. However, shortly following the operation of the outgoing toll selector 300 to seize the trunk 406, the pulse delay relay R370 restores, it being of the slow-to-release type, in order to remove the application of resistance battery potential from the EC conductor of the trunk 220 so that the register sender 208 may proceed with the sending of the third digit 0 therefrom.

Continuing now with the seizure of the repeater 400, ground potential in the outgoing toll selector 300 is applied to the C wiper of the main wiper set 302 and consequently to the C conductor of the trunk 406, thereby to complete a circuit substantially identical to that traced above, for energizing the upper winding of the release relay R420, so as to cause the latter relay to operate shortly thereafter, the latter relay being rendered slow-to-operate by the normally completed path, including the contacts 425, for short-circuiting the lower winding thereof. Upon operating, the release relay R420 interrupts, at the contacts 425, the path for short-circuiting the lower winding thereof, whereby the upper and lower windings of the release relay R420 are energized in series circuit relation via the C conductor of the trunk 406. Upon operating, the release relay R420 completes, at the contacts 422, a loop circuit between the upper and lower windings of the line relay R430 and the + and − conductors of the trunk 406; which loop circuit now extends back to the impulsing bridge in the sender link 205, since the call switch 204 and the outgoing toll selector 300 occupy their switched-through positions, whereby the line relay R430 operates over the loop circuit mentioned. Further, the release relay R420 completes, at the contacts 426, a circuit for operating the release pulse timer relay R435. Upon operating, the release pulse timer relay R435 sets its armature RA436 into vibration; and closes the contacts 437, whereby the winding of the release pulse timer relay R440 is energized intermittently by the vibratory action of the armature RA436, causing the release pulse timer relay R440 to operate shortly thereafter, the latter relay being of the slow-to-operate type. At this point it is noted that the incoming release relay R460 normally occupies its operated position, the operating circuit therefor being normally completed.

Upon operating, the release pulse timer relay R440 completes, at the contacts 442, a holding circuit for energizing the winding thereof; and completes, at the contacts 441 and 445, a circuit for operating the supervisory pulse relay R660. Also, the release pulse timer relay R440 completes, at the contacts 441, a multiple circuit for operating the pad cut-out relay R600. Upon operating, the pad cut-out relay R600 interrupts, at the contacts 602′, a termination circuit, including the windings 606, 608, and 697 of the pad 695 and the condenser 696, between the line conductors of the toll line 702; and completes, at the contacts 601′ and 603′ direct paths for short-circuiting the windings 605, 606 and 607, 608 respectively of the pad 695. Finally, the release pulse timer relay R440 completes, at the contacts 441, a multiple circuit for illuminating the busy lamp L687 in order to indicate that the repeater 400 is busy at this time.

Upon operating the supervisory pulse relay R660 completes, at the contacts 663, a circuit for operating the send relay R675; and completes, at the contacts 664, a circuit for energizing the upper winding of the prepare relay R670 in order to cause the latter relay to operate. Also, the supervisory pulse relay R660 completes, at the contacts 664, a multiple circuit for operating the series relay R410. Upon operating, the prepare relay R670 interrupts, at the contacts 673, the application of ground potential upon the receiving switch conductor C697 extending to the tone unit 601, thereby to bring about the restoration of the receiving switch relay in the tone unit 601, whereupon the tone unit 601 is placed in sending condition. Also, the prepare relay R670 completes, at the contacts 674, a circuit for energizing the lower winding of the sequence relay R680 in order to cause the latter relay to operate; and completes, at the contacts 674, a multiple circuit for operating the control relay R505. Upon operating, the send relay R675 completes, at the contacts 678, a path for applying ground potential to the modulation cut-off conductor C608 extending to the tone unit 601, thereby to insure that the modulation cut-off relay in the tone unit 601 is maintained in its restored position, whereby the tone unit 601 is rendered operative to send 60 cycle modulated 1000 cycle current over the sending − conductor C601 and the sending + conductor C602 extending therefrom. Also, the send relay R675 interrupts, at the contacts 677, a normally completed path between the sending − conductor C601 and the sending + conductor C602; and completes, at the contacts 676, a path, including the resistor 693, the condenser 692, and the contacts 601′ and 603′, between the sending − conductor C601 and the sending + conductor C602 and the line conductors of the toll line 702, whereby 60 cycle modulated 1000 cycle current is transmitted from the tone unit 601 individually associated with the repeater 400 over the line conductors of the toll line 702 extending from the office 20 to the office 30. This 60 cycle modulated 1000 cycle current transmitted over the line conductors of the toll line 702 is repeated by the voice current repeaters 703, etc., to the repeater 700 in the office 30, in order to effect seizure of the repeater 700, in a manner more fully explained hereinafter. Also, upon operating, the sequence relay R680 completes, at the contacts 683, a holding circuit for energizing the upper winding thereof; and completes, at the contacts 686, a holding circuit for energizing the lower winding of the prepare relay R670. Also, the supervisory pulse relay R660 completes, at the contacts 662, a holding circuit for energizing the winding thereof.

Upon operating, the control relay R505 completes, at the contacts 508, a circuit for energizing the winding of the inter-pulse timer relay R630, to cause the latter relay to operate shortly thereafter, it being of the slow-to-operate type. Further, the control relay R505 completes, at the contacts 506, a path for connecting battery potential by way of the upper winding of the tandem test relay R470 to the EC conductor of the trunk 406, thereby to permit the tandem test relay R470 to operate in the special event that the preceding circuit connection includes a repeater of the general character of the repeater 400; which circumstance is not encountered in the extension of the present connection, whereby the tandem test relay R470 is not operated. Upon operating, the interpulse timer relay R630 interrupts at the contacts 634 the holding circuit for maintaining operated the supervisory pulse relay R660, whereby the latter relay restores shortly thereafter, it being of the slow-to-release type. Also, the inter-pulse timer relay R630 completes, at the contacts 635, a circuit for energizing in series the upper and lower windings of the answer supervisory relay R490; whereby the latter relay operates, it being of the differential type, as explained more fully hereinafter. Upon operating, the answer supervisory relay R490 completes, at the contacts 495, a holding circuit for energizing in series the upper and lower windings thereof; and interrupts, at the contacts 496, the normally completed path for applying battery potential by way of the resistor 403 to the associated terminal of the lower winding thereof; and interrupts, at the contacts 491, the previously mentioned path for connecting the upper winding of the tandem test relay R480 to the EC conductor of the trunk 406. Further the answer supervisory relay R490 completes, at the contacts 492, a path for applying ground potential by way of the upper winding of the line supervisory relay R480 to the EC conductor of the trunk 406, which is without effect at this time since the above described operation takes place following the transmission of the second digit 6 from the register sender 208 and preceding the transmission of the third digit 0 to effect operation of the incoming toll selector 1000 in the office 30.

Specifically, it will be observed that the pulse delay relay R1220 in the sender link 205 is of the marginal type, whereby the connection of battery potential via the upper winding of the tandem test relay R470 to the EC conductor of the trunk 406 and the subsequent connection of ground potential via the upper winding of the line supervisory relay R480 to the EC conductor of the trunk 406, in the operation of the repeater 400 described above, do not bring about operation of the pulse delay relay R1220 at this time.

When the supervisory pulse relay R660 restores, it interrupts, at the contacts 664, the circuit for maintaining operated the series relay R410, thereby to cause the latter relay to restore shortly thereafter, it being of the slow-to-release type. Also, the supervisory relay R660 interrupts, at the contacts 661, the circuit for maintaining operated the control relay R505; and interrupts, at the contacts 663, the circuit for maintaining operated the send relay R675. Further, the supervisory pulse relay R660 interrupts, at the contacts 664, the multiple circuit for energizing the upper winding of the prepare relay R670. Upon restoring, the send relay R675 interrupts, at the contacts 676, the connection between the line conductors of the toll line 702 and the sending — conductor C601 and the sending + conductor C602 extending to the tone unit 601; and completes, at the contacts 677, the normal connection between the sending — conductor C601 and the sending + conductor C602, thereby to terminate the transmission over the toll line 702 from the tone unit 601 transmission of the short seizing pulse of 60 cycle modulated 1000 cycle current. Further, the send relay R675 interrupts, at the contacts 678, the path for applying ground potential to the modulation cut-off conductor C608; whereby, there is completed, a path, including the contacts 489, the resistor 463 and the contacts 424 and 682, for applying battery potential to the modulation cut-off conductor C608. This application of battery potential to the modulation cut-off conductor C608 extending to the tone unit 601 effects operation of the modulation cut-off relay therein, whereby the tone unit 601 is conditioned at this time to transmit 1000 cycle current therefrom upon the next seizure thereof. Upon restoring, the control relay R505 interrupts, at the contacts 508, the circuit for maintaining operated the interpulse timer relay R630. When the series relay R410 restores, it interrupts, at the contacts 412, the circuit for energizing the lower winding of the prepare relay R670 in order to cause the latter relay to restore. Upon restoring, the prepare relay R670 recompletes, at the contacts 673, the path for applying ground potential to the receiving switch conductor C607 extending to the tone unit 601, thereby to effect operation of the receiving switch relay therein, whereby the tone unit 601 is placed in receiving condition. Upon restoring, the interpulse timer relay R630 reprepares, at the contacts 634, a point in the circuit for operating the supervisory pulse relay R660 for a purpose more fully explained hereinafter.

Recapitulating, at this time the outgoing toll selector 300 has operated to select the trunk 406 extending to the repeater 400, whereby the repeater 400 is operated in conjunction with the tone unit 601 to transmit a short splash of 60 cycle modulated 1000 cycle current, constituting a seizure signal, over the toll line 702; thereby to condition the repeater 700 in the office 30 to be responsive to the third digit 0 that will be subsequently sent by the register sender 208 and repeated by the repeater 400 over the toll line 702.

Specifically, the seizure signal transmitted over the toll line 702 is conducted over the windings 706, 705 and 708, 707 of the pad 795 and the receiving — conductor C705 and the receiving + conductor C706 to the tone unit 701 associated with the repeater 700 in order to cause operation of the signal-in relay in the tone unit 701, whereby ground potential is applied for a short time duration to the signal-in conductor C709 extending therefrom. This application of ground potential to the signal-in conductor C709 completes a circuit for energizing the winding of the signal-in relay R720 in the repeater 700, whereby the latter relay operates shortly thereafter, it being of the slow-to-operate type. Upon operating, the signal-in relay R720 interrupts, at the contacts 725 the normal completed circuit for maintaining operated the incoming release relay R960; however, the latter relay does not immediately restore as it is of the slow-to-release type. Also, the signal-in relay R720 completes, at the contacts 722, a circuit for illuminating the busy lamp L787 in order to indicate the busy condition of the repeater 700 at this time; and completes, at the contacts 722, a multiple circuit for operating the pad cut-out relay R700. Upon operating, the pad cut-out relay R700 interrupts, at the contacts 702' a normally completed termination circuit, including the windings 706, 707 and 797 of the pad 795. and the condenser 796, across the line conductors of the toll line 702; and completes, at the contacts 701' and 703', paths for respectively short-circuiting the windings 706, 705 and 708, 707 of the pad 795. Also, the signal-in relay R720 completes, at the contacts 722 and 723, multiple circuits for energizing the winding of the interpulse timer relay R730 and for operating the series relay R910, whereby the interpulse timer relay R730 operates shortly thereafter, it being of the slow-to-operate type. Further, the signal-in relay R720 completes, at the contacts 726, a circuit for energizing the lower winding of the selector seize relay R950. When the lower winding of the selector seize relay R950 is thus energized, it operates through its first step to complete, at the contacts 956, a path for short-circuiting the upper winding thereof in order to prevent operation of the selector seize relay R950 through its second step at this time, the selector seize relay R950 being of the two-step type.

At the conclusion of the seizure signal the tone unit 701 brings about the removal of ground potential from the signal-in conductor C709 and the consequent restoration of the signal-in relay R720 in the repeater 700. Upon restoring, the signal-in relay R720 recompletes, at the contacts 725, the circuit for maintaining operated the incoming release relay R960 in order positively to prevent restoration of the latter relay. Also, the signal-in relay R720 interrupts, at the contacts 726, the previously mentioned path for short-circuiting the upper winding of the selector seize relay R950; whereby, there is completed a circuit, including the contacts 956 and 962 and 943, for energizing in series the upper and lower windings thereof, causing the selector seizure relay R950 to operate through its second step. When the selector seize relay R950 operates through its second step it interrupts, at the contacts 953, the previously completed path for applying battery potential by way of the upper winding of the release relay R920 to the C conductor of the trunk 906; and completes, at the contacts 952, a path for applying ground potential to the C conductor of the trunk 906, thereby to mark the trunk 906 and consequently, the repeater 700 as busy to the outgoing toll selectors 1130, etc., having access thereto. Further, the selector seize relay R950 completes, at the contacts 955, an alternative circuit for maintaining operative the pad cut-out relay R700; and completes, at the contacts 951, a path for applying ground potential to the C conductor of the trunk 905 extending to the incoming toll selector 1000; and completes, at the contacts 959, a circuit for energizing the lower winding of the loop test relay R800 in order to cause the latter relay to operate shortly thereafter, it being of the slow-to-operate type. Upon operating, the loop test relay R800 completes, at the contacts 801, a circuit for operating the control relay R890. Also, upon restoring the signal-in relay R720 interrupts, at the contacts 723, the previously traced circuit for maintaining operated the interpulse timer relay R730 and the series relay R910; whereby, the interpulse timer relay R730 restores substantially immediately and the series relay R910 restores shortly thereafter, the series relay R910 being of the slow-to-release type.

Upon operating the control relay R890 completes, at the contacts 891, a loop circuit between the upper winding of the loop test relay R800 and the — and + conductors of the trunk 905 extending to the incoming toll selector 1000; whereby, the upper winding of the loop test relay R800 is energized over this circuit effecting seizure of the incoming toll selector 1000. Also, the control relay R890 completes, at the contacts 897, a path between the false seize conductor C817 and the junction between the upper and lower windings of the answer supervisory relay R990; over which path the upper and lower windings of the answer supervisory relays R990 are not immediately energized; and which circuit is completed in case of false seizure of the repeater 700. Further, the control relay R890 completes, at the contacts 898 a path for applying ground potential to the pulse cut-in conductor C711 extending to the tone unit 701 in order to effect operation of the pulse cut-in relays in the tone unit 701; whereby the tone unit 701 is conditioned to respond to the unmodulated 1000 cycle dialing pulses subsequently transmitted over the toll line 702 and constituting a dialing signal. Further, the control relay R890 completes, at the contacts 893, a path for applying ground potential by way of the lower winding of the tandem test relay R970 to the EC conductor of the trunk 905 extending to the incoming toll selector 1000, thereby to permit operation of the tandem test relay R970 in the special event that a toll connection is ultimately completed involving other toll lines embodying repeaters of the general character of the repeaters 400 and 700; which circumstance is not encountered in the extension of the present connection. Further, the control relay R890 completes, at the contacts 893, a multiple path for applying ground potential via the winding of the wait relay Y800 to the EC conductor of the trunk 905 extending to the incoming toll selector 1000; thereby to permit operation of the wait relay Y800 when a delay is encountered in the extension of a connection from the office 30 to the office 40; which situation is not encountered in the extension of the present connection.

More particularly, the application of ground potential to the C conductor of the trunk 905 completes the previously mentioned loop circuit, including the contacts 1081 and 1083, for energizing in series the upper and lower windings of the line relay R1020 in the incoming toll selector 1000 and the upper winding of the loop test relay R800 in the repeater 700; whereby these relays are operated, as previously noted. Upon operating, the line relay R1020 completes, at the contacts 1021, a circuit, including the contacts 1088, for operating the release relay R1030; whereby the latter relay completes, at the contacts 1033, a path for applying ground potential in the incoming toll selector 1000 to the C conductor of the trunk 905. Also, the application of ground potential to the C conductor of the trunk 905 completes a circuit, including the set of switch springs S1010, for energizing the upper winding of the series relay R1040 in order to cause the latter relay to operate. At this time, the incoming toll selector 1000 has been seized by the repeater 700 and is in readiness to receive the third digit 0.

Continuing with the extension of the present connection, the register sender 208 sends the third digit 0 over the connection, including the + and — conductors of the trunk 406, whereby the line relay R430 in the repeater 400 follows. Each time the line relay R430 restores and then reoperates, it completes and then interrupts, at the contacts 432, a circuit for energizing the winding of the series relay R410, thereby to cause the latter relay to operate and to remain operated during impulsing, since it is of the slow-to-release type. Also, each time the line relay R430 restores and then reoperates, it completes and then interrupts, at the contacts 431, a circuit for energizing the winding of the send relay R675, thereby to cause the latter relay to follow. Upon operating, the series relay R410 recompletes, at the contacts 412, the previously mentioned circuit for energizing the lower winding of the prepare relay R670 in order to cause the latter relay to operate. Since the series relay R410 is maintained operated throughout the impulses of the present digit, and the prepare relay R670 is operated by the series relay R410, as explained above, it will be understood that the prepare relay R670, is also maintained operated throughout the impulses of the present digit. Upon reoperating, the prepare relay R670 again interrupts, at the contacts 673, the path for applying ground potential to the receiving switch conductor C607 extending to the tone unit 601, whereby the tone unit 601 is conditioned to send unmodulated 1000 cycle current, since battery potential at this time appears upon the modulation cut-off conductor C608 extending thereto, as previously noted. Each time the send relay R675 operates and then restores, it completes, and then interrupts, at the contacts 676 the previously traced connection between the sending — conductor C601 and the sending + conductor C602 and the line conductors of the toll line 702; and interrupts, and then recompletes, at the contacts 677, the previously mentioned connection between the sending — conductor C601 and the sending + conductor C602. Each time the send relay R675 operates and then restores, it completes, and then interrupts, at the contacts 678, the previously mentioned path for applying ground potential to the modulation cut-off conductor C608 extending to the tone unit 601, whereby the winding of the modulation cut-off relay in the tone unit 601 is short-circuited intermittently. However, the modulation cut-off relay in the tone unit 601 does not restore during this intermittent short-circuiting of the winding thereof, but is maintained steadily operated causing the unmodulated 1000 cycle current to be projected over the sending — conductor C601 and the sending + conductor C602 extending therefrom, and consequently pulses of this unmodulated 1000 cycle current to be transmitted over the line conductors of the toll line 702 corresponding to the intermittent operation of the send relay R675. Accordingly, at this time, a plurality of impulses of unmodulated 1000 cycle current corresponding to the impulses of the present digit are transmitted over the line conductors of the toll line 702 to the repeater 700 and the associated tone unit 701. At the conclusion of the present digit the line relay R430 is maintained in its operated position, effecting immediate restoration of the send relay R675, and the restoration of the series relay R410 shortly thereafter, and the consequent restoration of the prepare relay R670.

Thus when the third digit 0 is sent from the register sender 208, it is repeated by the repeater 400 to the repeater 700 in the form of a series of unmodulated 1000 cycle pulse of current and the tone unit 701 associated with the repeater 700 responds thereto. Specifically, the in-pulse relay in the tone unit 701 operates and restores repeating a corresponding series of ground impulses from the tone unit 701 over the dial-in conductor 710 extending therefrom. The series of ground impulses thus transmitted over the dial-in conductor C710 completes intermittently a circuit for operating the dial-in relay R880 in the repeater 700 in order to cause the latter relay to follow. Each time the dial-in relay R880 operates and then restores, it completes, and then interrupts, at the contacts 882, a circuit for operating the wait relay Z800, whereby the latter relay follows. Each time the wait relay Z800 operates and then restores, it completes and then interrupts, at the contacts Z4, a circuit for operating the ring control relay R860; thereby to cause the latter relay to operate and remain operated during impulsing since it is of the slow-to-release type. Also, each time the dial-in relay R880 operates and then restores, it completes, and then interrupts, at the contacts 883, a circuit for energizing the winding of the series relay R910; thereby to cause the latter relay to operate and remain operated during impulsing since it is of the slow-to-release type. Also, each time the dial-in relay R880 operates and then restores, it completes and then interrupts, at the contacts 883, a substantially identical multiple circuit for energizing the winding of the interpulse timer relay R730, thereby to cause the latter relay to operate and restore intermittently the interpulse timer relay R730 operating shortly following energization of the winding thereof since it is of the slow-to-operate type. When the series relay R910 operates, it completes, at the contacts 911, a holding circuit for energizing the lower winding of the loop test relay R800; thereby to prevent the latter relay from restoring incident to the interruption of the previously traced loop circuit including the upper winding thereof and extending via the trunk 905 to the incoming toll selector 1000. Upon operating, the ring control relay R860 completes, at the contacts 861, a holding circuit for energizing the winding thereof; and completes, at the contacts 862, a circuit for operating the ring control relay R850. Also, the ring control relay R60 interrupts at the contacts 864, the previously mentioned connection between the false seize conductor C817 and the junction between the upper and lower windings of the answer supervisory relay R990; thereby to prevent operation of the latter relay over the false seize conductor C817 since the repeater 700 has not been falsely seized as evidenced by the prompt reception by the associated tone unit 701 of the dialing signal constituting the present digit.

Also, each time the dial-in relay R880 operates and then restores, it interrupts and then recompletes, at the contacts 881, the previously traced loop circuit between the upper winding of the loop test relay R800 and the upper and lower windings of the line relay R1020 in the incoming toll selector 1000; whereby, the impulses of the present digit are repeated, at the contacts 881, over the trunk 905 to the line relay R1020 in the incoming toll selector 1000 so as to cause the latter relay to follow. The detailed operation of the incoming toll selector 1000 is identical to that of the outgoing toll selector 300 described in Section 3, whereby the Strowger mechanism 1001 is operated by the vertical magnet M1003 ten steps in the vertical direction to select the group of trunks, including the trunk 1115, and is then operated automatically in the rotary direction by the rotary magnet M1005 to select an idle trunk in the level noted. Specifically, the main wiper set 1002 may be operated to select the particular trunk 1115 extending to the inward trunk circuit 1114 so as to bring about operation of the switch relay R1080 and the consequent restoration of the change-over relay R1060, the line relay R1020 and the release relay R1030, whereby the incoming toll selector 1000 occupies its switched-through position at this time.

At the conclusion of the third digit 0, the dial-in relay R880 in the repeater 700 remains restored, interrupting, at the contacts 883, the previously traced multiple circuits for operating the interpulse timer relay R730 and for maintaining operated the series relay R910; whereby the interpulse timer relay R730 restores substantially immediately and the series relay R910 restores shortly thereafter, it being of the slow-to-release type. Upon restoring, the series relay R910 interrupts, at the contacts 911, the holding circuit for energizing the lower winding of the loop test relay R800; whereby the loop test relay R800 restores since the loop circuit for energizing the upper winding thereof has been dried at this time as a consequence of the switching-through operation of the incoming toll selector 1000 and the selection thereby of the trunk 1115 extending to the inward trunk circuit 1114, as explained more fully below. At this time, since all of the digits registered in the register sender 208 associated with the operator position 201 in the office 20 have been sent therefrom, the register sender 208 and the sender link 205 are released so that battery potential in the call switch 204 is applied to the EC conductor of the trunk 220 and thence to the EC conductor of the trunk 406 through the outgoing toll selector 300 in its switched-through position, whereby there is completed a circuit for energizing the upper winding of the line supervisory relay R480 in the repeater 400. Specifically, at this time, ground potential is applied by way of the contacts 441, to one terminal of the upper winding of the line supervisory relay R480; and the other terminal of the upper winding of the latter relay is connected by way of the contacts 488, 492, Z1 and 485 to the EC conductor of the trunk 406; and low resistance battery potential is applied to the EC conductor of the trunk 406 in the call switch 204, as previously explained. Accordingly, the line supervisory relay R480 operates completing, at the contacts 487, a holding circuit for energizing in series the upper and lower windings thereof; and interrupting, at the contacts 485 and 488 points in the original circuit for energizing the upper winding thereof. Also, the line supervisory relay R480 interrupts, at the contacts 489, the path for applying battery potential by way of the resistor 463 to the modulation cutoff conductor C608 extending to the tone unit 601. When battery potential is thus removed from the modulation cutoff conductor C608, the modulation cutoff relay in the tone unit 601 restores, whereby the tone unit 601 is prepared to send 60 cycle modulated 1000 cycle current the next time it is employed for sending purposes. Also, the line supervisory relay R430 prepares, at the contacts 486, a path traced hereinafter, and governed by the contacts 531 of the supervisory relay R530 for applying direct ground potential to the EC conductor of the trunk 406, thereby to control operation of the call supervisory lamp in the call switch 204, as explained more fully hereinafter. Further, the line supervisory relay R480 interrupts, at the contacts 481 and 483, the loop circuit extending via the + and — conductors of the trunk 406 to the windings of the line relay R430 in order to cause the latter relay to restore. Further, the line supervisory relay R480 completes, at the contacts 482 and 484, a connection between the — and + conductors of the trunk 406 and the monitoring — conductor C603 and the monitoring + conductor C604 extending to the tone unit 601. Finally, the receiving — conductor C605 and the receiving + conductor C606 are operatively connected in the tone unit 601 to the monitoring — conductor C603 and the monitoring + conductor C604. Accordingly, the line conductors of the operator position circuit 201 are operatively connected through the tone unit 601 to the line conductors of the toll line 702, whereby the operator at the position circuit 201 may subsequently listen-in on the toll line 702 without interfering in any way with the subsequent reception by the tone unit 601 of signals received over the toll line 702 from the office 30; and specifically, the end-of-dialing signal that is subsequently transmitted by the tone unit 701 from the office 30; and specifically, the end-of-dialing signal that is subsequently transmitted by the tone unit 601 associated with the repeater 400 is audible to the operator at the position circuit 201, as explained more fully hereinafter.

Also, at this time, high resistance battery potential in the operator position 201 is connected through the call switch 204 to the — and + conductors of the trunk 220 and consequently to the — and + conductors of the trunk 406 extending to the repeater 400, whereby the application of high resistance battery potential to the + conductor of the trunk 406 completes a circuit for energizing the winding of the re-ring relay R400 in the repeater 400 in series with the winding of the pad control relay R690, whereby the pad control relay R690 operates but the re-ring relay R400 does not operate since it is of the marginal type. Upon operating, the pad control relay R690 interrupts, at the contacts 691, the circuit for maintaining operated the pad cutout relay R600 in order to cause the latter relay to restore shortly thereafter, it being of the slow-to-release type. When the pad cutout relay R600 restores, it interrupts, at the contacts 601' and 603', the previously mentioned pad for short-circuiting the windings 605, 606 and 607, 608 of the pad 695; and completes, at the contacts 602, the termination circuit, including the condensor 696 and the windings 697, 606 and 608 of the pad 695, between the line conductors of the toll line 702; whereby the windings 605, 606 and 607, 608 of the pad 695 are included in the connection between the toll line 702 and the operator position 201.

As previously noted, when the incoming toll selector 1000 switches-through to extend the connection to the inward trunk circuit 1114, the loop circuit extending back over the trunk 1115 to the incoming toll selector 1000 is dried; and also ground potential is applied in the inward toll circuit 1114 to the C conductor of the trunk 1115. Accordingly at this time ground potential is applied to the EC conductor of the trunk 905 and the loop circuit extending via the — and + conductors of the trunk 905 is dried. This drying of the loop circuit mentioned brings about the deenergization of the upper winding of the loop test relay R800 in the repeater 700 and the consequent restoration thereof. Upon restoring, the loop test relay R800 interrupts, at the contacts 801, the circuit for maintaining operated the control relay R890; and interrupts, at the contacts 802, the holding circuit for maintaining operated the ring control relay R860 in order to cause the latter relay to restore shortly thereafter, it being of the slow-to-release type. Upon restoring, the control relay R890 interrupts, at the contacts 893, the previously traced connection for applying ground potential by way of the lower winding of the tandem test relay R970 and the multiple connection for applying ground potential by way of the winding of the wait relay Y800 to the EC conductor of the trunk 905; and completes, at the contacts 892, a circuit for energizing the upper winding of the supervisory relay R710, ground potential being applied in the inward trunk circuit 1114 through the EC conductors of the various trunks, including the trunk 905, at this time. When the upper winding of the supervisory relay R710 is thus energized, it operates; and also the control relay R890 interrupts, at the contacts 898, the path for applying ground potential to the pulse cut-in conductor C711 extending to the tone unit 701 in order to cause the pulse cut-in relay in the tone unit 701 to restore preventing further response by the tone unit 701 to dialing signals transmitted over the toll line 702.

Upon operating, the supervisory relay R710 completes, at the contacts 713, a circuit for operating the supervisory pulse relay R760. Upon operating, the supervisory pulse relay R760 completes, at the contacts 763, the circuit for operating the send relay R775; and completes, at the contacts 764, the circuit for energizing the upper winding of the prepare relay R770 in order to cause the latter relay to operate. Upon operating, the prepare relay R770 completes, at the contacts 774, a circuit for energizing the lower winding of the sequence relay R780 in order to cause the latter relay to operate; and completes, at the contacts 774, a multiple circuit for operating the control relay R805. Upon operating, the control relay R805 completes, at the contacts 808, a circuit for operating shortly thereafter, the interpulse timer relay R730; and a multiple circuit for operating the series relay R910. Upon operating, the series relay R910 completes, at the contacts 912, a holding circuit for energizing the lower winding of the prepare relay R770. Also, the control relay R805 completes, at the contacts 807, a circuit for energizing the lower winding of the supervisory control relay R820 and a multiple circuit for energizing the upper winding of the supervisory control relay R820; however, the latter relay does not operate at this time as it is of the differential type. Upon operating, the interpulse timer relay R730 interrupts, at the contacts 734, the circuit for maintaining operated the supervisory pulse relay R760; thereby to cause the latter relay to restore shortly thereafter, it being of the slow-to-release type. Upon restoring, the supervisory pulse relay R760 interrupts, at the contacts 761, the circuit for maintaining operated the control relay R805; and, upon restoring, the control relay R805 interrupts, at the contacts 807, the circuit for energizing in multiple the upper and lower windings of the supervisory control relay R820. The magnetic flux in the lower winding of the supervisory control relay R820 does not immediately decay by virtue of the shunt connection including the upper winding thereof and the contacts 822 extending also to battery potential; whereby the upper and lower windings of the supervisory control relay R820 are effectively energized in series circuit relation during the decay of the magnetic flux therein, causing the latter relay to operate in order to close its contacts 821, which are, in turn, connected by way of the contacts 811 and 955 to ground potential. Thus, the upper and lower windings of the supervisory control relay R820 are energized in series circuit relation causing the latter relay to operate fully in order to interrupt, at the contacts 822, the previously mentioned path for short-circuiting the associated resistor 829. Also, the supervisory control relay R820 interrupts, at the contacts 828, a further point in the circuit for operating the supervisory pulse relay R760; and completes, at the contacts 824, a circuit for operating the supervisory relay R830 and a multiple circuit for energizing the lower winding of the line supervisory relay R980 in order to cause the latter relay to operate. Upon operating, the line supervisory relay R980 completes, at the contacts 987, a holding circuit for energizing the upper and lower windings thereof in series circuit relation. Also, upon operating the sequence relay R780 completes, at the contacts 783, a circuit for energizing the upper winding of the switchover relay R870 in order to cause the latter relay to operate. Upon operating, the switchover relay R870 completes, at the contacts 875, a holding circuit for energizing the upper winding thereof; and completes, at the contacts 872 and 873, the previously traced connection between the − and + conductors of the trunk 905 and the line conductors of the toll line 702.

Also, when the ring control relay R860 restores, it interrupts, at the contacts 862, the circuit for maintaining operated the ring control relay R850 in order to cause the latter relay to restore shortly thereafter, it being of the slow-to-release type. Further, upon restoring, the ring control relay R860 completes, at the contacts 863, a circuit for operating the ring control relay R840. Upon operating, the ring control relay R840 completes, at the contacts 842, a circuit for operating the ring relay R835. Upon operating, the ring relay R835 interrupts, at the contacts 836, the previously mentioned connection between the + conductor of the trunk 905 and the corresponding line conductor of the toll line 702; and completes, at the contacts 837, a path including the resistor 836′ for applying battery potential to the + conductor of the trunk 905 and consequently to the + conductor of the trunk 1115 extending to the inward trunk circuit 1114, thereby to cause the inward trunk circuit 1114 to bring about operation of the start apparatus at the operator position 1101 so that operation of the answer switch of the previously selected link thereat is initiated. For purposes of illustration, assuming that the operator at position 1101 has previously selected the link 1102 for use and has operated the talk key thereof, operation of the answer switch 1103 is initiated to find the trunk 1116 extending from the calling inward trunk circuit 1114 at this time. Specifically, the answer switch 1103 finds the trunk 1116 and a connection is extended to the operator position 1101 effecting the answering of the call from the office 20, as explained more fully hereinafter.

Upon restoring, the ring control relay R850 in the repeater 700 interrupts, at the contacts 852, the circuit for maintaining operated the ring control relay R840 in order to cause the latter relay to restore shortly thereafter, it being of the slow-to-release type. Upon restoring, the control relay R840 interrupts, at the contacts 842, the circuit for maintaining operated the ring relay R835 in order to cause the latter relay to restore shortly thereafter, it being of the slow-to-release type. Upon restoring, the ring relay R835 interrupts, at the contacts 837, the path for applying battery potential by way of the resistor 836′ to the + conductor of the trunk 905; and recompletes, at the contacts 836, the point in the previously mentioned connection between the + conductor of the trunk 905 and the corresponding line conductor of the toll line 702.

Also, upon restoring, the supervisory pulse relay R760 interrupts, at the contacts 763, the circuit for maintaining operated the send relay R775; and, upon restoring, the control relay R805 interrupts, at the contacts 808, the circuit for maintaining operated the interpulse timer relay R730 and the series relay R910; whereby, the interpulse timer relay R730 restores substantially immediately and the series relay R910 restores shortly thereafter, it being of the slow-to-release type. Upon restoring, the series relay R910 interrupts, at the contacts 912, the holding circuit for energizing the lower winding of the prepare relay R770 in order to cause the latter relay to restore. During the time that the send relay R775 and the prepare relay R770 occupy their operated positions, the tone unit 701 was operatively connected to the toll line 702 and operated to transmit thereover a splash of 60 cycle modulated 1000 cycle current constituting an end-of-dialing signal.

This end-of-dialing signal returned over the toll line 702 is received by the tone unit 601 over the receiving − conductor C605 and the receiving + conductor C606 connected to the line conductors of the toll line 702 by way of the windings previously noted of the pad 695; whereby the tone unit 601 responds in order to bring about operation of the signal-in relay therein so that ground potential is applied to the signal-in conductor C609 extending therefrom. This application of ground potential to the signal-in conductor C609 completes a circuit for energizing the winding of the signal-in relay R620 in the repeater 400 thereby to cause the latter relay to operate shortly thereafter, it being of the slow-to-operate type. Upon operating, the signal-in relay R620 interrupts, at the contacts 625, the normally completed circuit for maintaining operated the incoming release relay R460, whereby the latter relay tends to restore shortly thereafter since it is of the slow-to-release type. However, at this time, the end-of-dialing signal is of short-time duration; whereby, the signal-in relay R620 does not occupy its operated position sufficiently long to bring about the restoration of the incoming release relay R460 as explained more fully hereinafter.

Also, upon operating, the signal-in relay R620 completes, at the contacts 626, a circuit for energizing the lower winding of the supervisory control relay R520, and a multiple circuit for energizing the upper winding of the supervisory control relay R520; whereby, the latter relay does not operate at this time since it is of the differential type. At the conclusion of the end-of-dialing signal, the signal-in relay in the tone unit 601 restores in order to interrupt the application of ground potential to the signal-in conductor C609 extending therefrom so as to bring about the restoration of the signal-in relay R620 in the repeater 400. Upon restoring, the signal-in relay R620 interrupts, at the contacts 626, the circuit for energizing in multiple the upper and lower windings of the supervisory control relay R520. The magnetic flux in the lower winding of the supervisory control relay R520 does not immediately decay by virtue of the shunt connection including the upper winding thereof and the contacts 522 extending also to the battery potential, whereby the upper and lower windings of the supervisory control relay R520 are effectively energized in series circuit relation during the decay of the magnetic flux therein, causing the latter relay to operate in order to close its contacts 521, which are, in turn, connected by way of the contacts 511 and the contacts 441 to ground potential. Thus the upper and lower winding of the supervisory control relay R520 are energized in series circuit relation causing the latter relay to operate fully in order to interrupt, at the contacts 522, the path for short-circuiting the resistor 529. Upon operating fully, the supervisory control relay R520 interrupts, at the contacts 526, a further point in the circuit for energizing in multiple the upper and lower windings thereof; and prepares, at the contacts 525, a circuit for energizing in multiple the upper and lower windings of the answer supervisory relay R510. Also, the supervisory control relay R520 completes, at the contacts 524, a circuit for operating the supervisory relay R530. Upon operating, the supervisory relay R530 completes, at the contacts 531, a path for applying direct ground potential to the EC conductor of the trunk 406 and consequently to the EC conductor of the trunk 220 in order to bring about illumination of the call supervisory lamp, not shown, in the call switch 204 so as to render to the operator at the position 201 end-of-dialing supervision. Also the end-of-dialing signal in the form of a splash of 60 cycle modulated 1000 cycle current returned over the toll line 702 and via the receiving — conductor C605 and the receiving + conductor C606 to the tone unit 601 is coupled therein to the monitoring — conductor C603 and to the monitoring + conductor C604 and consequently is returned to the operator position 201, whereby the operator thereat thus receives an audible end-of-dialing signal. Further, when the signal-in relay R620 in the repeater 400 restores, it again completes, at the contacts 625, the circuit for maintaining operated the incoming release relay R460; which latter relay is maintained operated during the reception of the end-of-dialing signal by the repeater 400, as previously mentioned.

When the answer switch 1103 of the link 1102 finds the trunk 1116 extending from the inward trunk circuit 1114 bringing about the answering of the call at the operator position 1101, in the manner described above, the inward trunk circuit 1114 operates to interrupt the path for applying ground potential to the EC conductor of the trunk 1115 and consequently to the EC conductor of the trunk 905 in order to interrupt the circuit for energizing the upper winding of the supervisory relay R710 causing the latter relay to restore. Upon restoring, the supervisory relay R710 completes, at the contacts 714, a circuit for operating the supervisory pulse relay R760. Upon operating, the supervisory pulse relay R760 effects recycling of the relays previously mentioned and including the send relay R775; whereby the tone unit 701 is operatively connected to the toll line 702 to send a splash of 60 cycle modulated 1000 cycle current thereover, and constituting an answer signal. During this cycling of the relays mentioned the control relay R805 operates and then restores, completing and then interrupting, at the contacts 807, a circuit for energizing in multiple the upper and lower windings of the answer supervisory relay R810. The answer supervisory relay R810 operates when the circuit for energizing in multiple the upper and lower windings thereof is interrupted, as previously explained, in order to complete, at the contacts 812, a holding circuit for energizing in series the upper and lower windings thereof. Also, upon operating, the answer supervisory relay R810 interrupts, at the contacts 811, the circuit for maintaining operated the supervisory control relay R820; and, upon restoring the supervisory control relay R820 interrupts, at the contacts 824, the circuit for maintaining operated the supervisory relay R830 in order to cause the latter relay to restore shortly thereafter, it being of the slow-to-release type.

This answer signal sent over the toll line 702 by the repeater 700, is received by the tone unit 601, in order to effect operation and subsequent restoration of the signal-in relay R620 in the repeater 400. When the signal-in relay R620 thus operates, it completes, at the contacts 626, the circuit for energizing the lower winding of the answer supervisory relay R510 and a substantially identical multiple circuit for energizing the upper winding of the answer supervisory relay R510, whereby the latter relay is not operated at this time since it is of the differential type. Upon the restoration of the signal-in relay R620, it interrupts, at the contacts 626, the multiple circuits for energizing the upper and lower windings of the answer supervisory relay R510, whereby the magnetic flux in the lower winding of the latter relay does not immediately decay by virtue of the shunt connection including the upper winding thereof and the contacts 513 extending also to battery potential. Thus, the upper and lower windings of the answer supervisory relay R510 are effectively energized in series circuit relation during the decay of the magnetic flux therein causing the latter relay to operate in order to close its contacts 512, which are, in turn, connected by way of the contacts 441 to ground potential. Thus the upper and lower windings of the answer supervisory relay R510 are energized in series circuit relation causing the latter relay to operate fully in order to interrupt, at the contacts 513, the path for short-circuiting in series the upper and lower windings thereof. Also, the answer supervisory relay R510 completes, at the contacts 512, a circuit for energizing the lower winding of the switch-through relay R640 in order to cause the latter relay to operate; and interrupts, at the contacts 511, the holding circuit for energizing in series the upper and lower winding of the supervisory control relay R520 in order to cause the latter relay to restore. Further, the answer supervisory relay R510 interrupts, at the contacts 515, a further point in the circuit for energizing in multiple the upper and lower windings of the supervisory control relay R520; and prepares, at the contacts 514, a circuit, traced hereinafter, for energizing the winding of the supervisory relay R530. Upon operating, the switch-through relay R640 completes, at the contacts 646, a holding circuit for energizing the upper winding thereof; and interrupts, at the contacts 642, the previously traced connection between the + conductor of the trunk 406 and the monitoring + conductor C604. Finally, the switchthrough relay R640 completes, at the contacts 641 and 643, a direct connection, including the contacts 482, 484 and 671, 672, as well as the windings 605, 606 and 607, 608 of the pad 695, between the + and — conductors of the trunk 406 and the line conductors of the toll line 702, thereby to complete an established connection between the operator position 201 in the office 20 and the operator position 1101 in the office 30.

Upon restoring, the supervisory control relay R520 interrupts, at the contacts 524, the circuit for retaining operated the supervisory relay R530 in order to cause the latter relay to restore shortly thereafter, it being of the slow-to-release type. Upon restoring, the supervisory relay R530 interrupts, at the contacts 531, the path for applying direct ground potential to the EC conductor of the trunk 406 to effect extinguishing of the call supervisory lamp, not shown, in the call switch 204 so as to render to the operator at the position 201 answer supervision. At this time, a connection is established between the calling operator position 201 in the office 20 and the called operator position 1101 in the office 30; and after the operator at the called operator position 1101 is advised concerning the extension of the present toll call, the operators, at the positions 201 and 1101, in the respective offices 20 and 30 may subsequently bring about the completion of a toll call involving the calling circuit and called circuit and then retire from the toll connection. When the operator in the position circuit 201 retires from the toll connection restoring the talk key of the link 202, high resistance battery potential is removed from the + conductor of the trunk 406, effecting the restoration of the pad control relay R690 in the repeater 400, whereupon the latter relay restores recompleting, at the contacts 691, the circuit for operating the pad cutout relay R600. Upon operating, the pad cutout relay R600 recompletes, at the contacts 601' and 603' the paths for short-circuiting the windings 605, 606 and 607, 608 of the pad 695, whereby the pad 695 is now excluded from the established connection.

Reconsidering the operation of the repeater 400 in conjunction with the repeater 700, it is noted that in the event all of the inward trunk circuits 1114, etc., are busy at the time the incoming toll selector 1000 is operated in response to the third digit 0, the main wiper set 1002 thereof is driven eleven steps in the rotary direction away from its normal rotary position operating the sets of switch springs S1011 and S1012. Operation of the set of switch springs S1011 completes a connection between the 120 I. P. M. conductor 1014 and the EC conductor of the trunk 905; and operation of the set of switch springs S1012 completes a circuit for energizing the upper winding of the series relay R1040 so as to cause the latter relay to operate and arrest further operation of the rotary magnet M1005 at this time.

This application of interrupted ground potential in the incoming toll selector 1000 upon the EC conductor of the trunk 905 completes intermittently the circuit for energizing the upper winding of the supervisory relay R710, in the repeater, whereby the latter relay operates and restores intermittently. The first time the supervisory relay R710 restores, it completes, at the contacts 714, the circuit for operating the supervisory pulse relay R760. Upon operating, the supervisory pulse relay R760 completes, at the contacts 763, the circuit for operating the send relay R775; and completes, at the contacts 764, the circuit for operating the prepare relay R770 via the upper winding thereof. Upon operating, the prepare relay R770 completes, at the contacts 774, the circuit for operating the control relay R805; and upon operating the control relay R805 completes, at the contacts 808, the circuit for operating the series relay R910; whereby, the latter relay, upon operating, completes, at the contacts 912, the holding circuit for energizing the lower winding of the prepare relay R770. Upon operating, the interpulse timer relay R730 interrupts, at the contacts 734, the circuit for maintaining operated the supervisory pulse relay R760; whereby, the latter relay restores shortly thereafter, it being of the slow-to-release type. Upon restoring, the supervisory pulse relay R760 effects the restoration of the send relay R775 and the control relay R805; whereby, the control relay R805 effects the restoration of the interpulse timer relay R730. Upon restoring, the interpulse timer relay R730 recompletes, at the contacts 734, when the supervisory relay R710 occupies its restored position closing the contacts 714, the circuit for reoperating the supervisory pulse relay R760; thereby to initiate another cycle of the relays mentioned above, in the manner explained. Since the supervisory relay R710 operates and restores intermittently, a new cycle of operation of the relays mentioned, as explained above, must be initiated when the supervisory relay R710 occupies its restored position closing the contacts 714; however, this condition occurs subsequently, whereby the relays mentioned repeat the cycle above described continuously at this time. During the short time interval between the operation and the subsequent restoration of the send relay R775, in the manner described above, the tone unit 701 is operatively connected to the toll line 702 and is rendered operative to send by virtue of the operation of the prepare relay R770, during the time interval mentioned, a short splash of 60 cycle modulated 1000 cycle current over the toll line 702. Accordingly, each time the relays mentioned operate through the cycle above described, a splash of 60 cycle modulated 1000 cycle current is sent over the toll line 702; whereby, a series of splashes of the 60 cycle modulated 1000 cycle current are transmitted over the toll line 702, at this time, and constitute a busy signal.

This busy signal, sent over the toll line 702, is received by the tone unit 601 in order to cause corresponding intermittent operation and restoration of the signal-in relay therein; whereby, the signal-in relay R620 in the repeater 400 operates and restores intermittently in a corresponding manner. Upon the prior reception of the end-of-dialing signal, the signal-in relay R620 brought about operation of the supervisory control relay R520 and the consequent operation of the supervisory relay R530, in the manner previously explained; whereby the supervisory relay R530, upon operating, effected illumination of the call lamp in the call switch 204, in the manner previously explained. Upon the reception of the first pulse of the busy signal, the signal-in relay R620 brings about operation of the answer supervisory relay R510 and the consequent restoration of the supervisory control relay R520 and the supervisory relay R530, in the manner previously explained; whereby the supervisory relay R530, upon restoring, effects extinguishing of the call lamp in the call switch 204. Upon the receipt of the second impulse of the busy signal, the signal-in relay R620 operates and then restores, to complete and then interrupt, at the contacts 626, the previously traced circuit for operating the supervisory relay R530, whereby the latter relay operates and then restores intermittently, the supervisory relay R530 restoring shortly thereafter, since it is of the slow-to-release type. Each time the supervisory relay R530 operates and then restores, it completes and then interrupts, at the contacts 531, the previously mentioned circuit for effecting illumination of the call lamp in the call switch 204, whereby the call lamp mentioned is flashed at this time 120 times per minute rendering to the operator at the position 201 toll-busy-supervision. When the operator at the position 201 receives the toll-busy-supervision, she proceeds to release the established connection, including the repeater 400 in the office 20 and the repeater 700 in the office 30, in a manner more fully explained hereinafter.

Continuing now with the established connection between the incoming circuit to the office 20 and the outgoing circuit from the office 30, at the conclusion of the established connection, the operator at the position 1101 in the office 30 may effect the release of the link 1102, whereby the inward trunk circuit 1114 is locked-out of service and controlled to recomplete the path for applying ground potential to the EC conductor of the trunk 1115 and consequently to the EC conductor of the trunk 905 in order to energize the upper winding of the supervisory relay R710 in the repeater 700, causing the latter relay to reoperate. Upon reoperating, the supervisory relay R710 completes, at the contacts 713, the previously traced circuit for operating the supervisory pulse relay R760. Upon operating, the supervisory pulse relay R760 effects operation of the send relay R775 and the prepare relay R770; the prepare relay R770 effects operation of the control relay R805; the control relay R805 effects operation of the interpulse timer relay R730; all in the manner previously explained. Also the control relay R805 completes, at the contacts 807, the previously traced circuit for operating the supervisory relay R830. Upon operating, the interpulse timer relay R730 effects the restoration of the supervisory pulse relay R760, in the manner previously explained; and upon operating the supervisory relay R830 completes, at the contacts 832, a holding circuit for maintaining operated the interpulse timer relay R730 and a substantially identical multiple circuit, also including the contacts 928, for maintaining operated the series relay R910; the series relay R910 having been operated incident to operation of the control relay R805, in the manner previously explained. Upon restoring, the supervisory pulse relay R760 effects restoration of the send relay R775 and the prepare relay R770; and the prepare relay R770 effects restoration of the control relay R805; all in the manner previously explained. Upon restoring, the control relay R805 interrupts, at the contacts 807, the previously traced circuit for maintaining operated the supervisory relay R830, thereby to cause the latter relay to restore shortly thereafter, it being of the slow-to-release type. Upon restoring, the supervisory relay R830 interrupts, at the contacts 833, the previously traced circuits for maintaining operated the series relay R910 and the interpulse timer relay R730; whereby the series relay R910 being of the slow-to-release type does not restore immediately, but the interpulse timer relay R730 does restore immediately to recomplete, at the contacts 734, the previously traced circuit for operating the supervisory pulse relay R760. The supervisory pulse relay R760 upon operating initiates another cycle of operation of the relays mentioned.

During the above described cycle of operation of the relays mentioned and while the send relay R775 and the prepare relay R770 occupy their operated positions, the tone unit 701 was operatively connected to the toll line 702 and also operated to transmit a pulse of 60 cycle modulated 1000 cycle current over the toll line 702. Accordingly at this time, the relays mentioned operate continuously through the cycle above described in order to cause a series of pulses of 60 cycle modulated 1000 cycle current to be transmitted over the toll line 702 and constituting a disconnect signal. In passing, it is noted that the disconnect signal is similar to the busy signal, previously described, but at a different rate as established by the cycle speed of the relays in the repeater 700. Accordingly, the disconnect signal is continuously repeated from the repeater 700 in the office 30 over the toll line 702 to the repeater 400 in the office 20 until the operator at the position 201 in the office 20 effects the release of the repeaters 400 and 700, in a manner more fully explained hereinafter.

When this disconnect signal is received by the repeater 400 in the office 20, the tone unit 601 responds thereto effecting intermittent operation of the signal-in relay R620 and the consequent intermittent operation of the supervisory relay R530, in a manner similar to that previously explained. Each time the supervisory relay R530 operates and then restores, it completes and then interrupts, at the contacts 531, the previously traced path for applying direct ground potential to the EC conductor of the trunk 406 so as to effect corresponding flashing of the call lamp in the call switch 204, so as to render to the operator at the position 201 disconnect supervision.

Upon receiving the disconnect supervision, the operator at the position 201 may effect the release of the link 202, whereby the outgoing toll selector 300 is released, in the manner explained in Section 3. When the outgoing toll selector 300 is thus released, ground potential is thus removed from the C conductor of the trunk 406 interrupting the previously traced holding circuit for energizing in series the upper and lower windings of the release relay R420 in the repeater 400 causing the latter relay to restore. Upon restoring, the release relay R420 completes, at the contacts 420, a circuit for operating the supervisory pulse relay R660; and interrupts, at the contacts 426, the circuit for maintaining operated the release pulse timer relay R435. Upon operating, the supervisory pulse relay R660 effects operation of the control relay R505, the send relay R675 and the prepare relay R670, all in a manner previously explained. Upon operating, the prepare relay R670 interrupts, at the contacts 673, the application of ground potential to the receiving switch conductor C607, whereby the tone unit 601 is conditioned to send 60 cycle modulated 1000 cycle current over the toll line 702. Upon operating, the send relay R675 completes, at the contacts 678, the path for applying ground potential to the modulation cutoff conductor C608 in order to insure restoration of the modulation cutoff relay in the tone unit 601 and effectively to connect the tone unit to the toll line 702, whereby the 60 cycle modulated 1000 cycle current is sent from the tone unit 601 over the toll line 702.

Also upon restoring, the release pulse timer relay R435 sets its armature RA436 into vibration, whereby the previously traced holding circuit for maintaining operated the release pulse timer relay R440 is automatically completed and interrupted, at the contacts associated with the vibratory armature RA436. After a time interval of approximately two seconds, the armature RA436 settles down effecting complete interruption of the holding circuit for maintaining operated the release pulse timer relay R440 so that the latter relay restores interrupting, at the contacts 444, the previously traced circuit for maintaining operated the supervisory pulse relay R660 causing the latter relay to restore and bring about the restoration of the prepare relay R670, the send relay R675 and the control relay R505. When the send relay R675 is thus restored, it disconnects the tone unit 601 from the toll line 702, thereby terminating the long pulse of 60 cycle modulated 1000 cycle current, constituting a release signal. Finally the release pulse timer relay R440 interrupts, at the contacts 441, the multiple holding circuits for maintaining operated the answer supervisory relay R490, the sequence relay R680, the switchthrough relay R640, the answer supervisory relay R510, the line supervisory relay R480 and the pad cutout relay R600. Accordingly at this time, only the incoming release relay R460 in the repeater 400 occupies its operated position, whereby the repeater 400 is completely released. Also at this time, battery potential is applied by way of the previously traced path, including the upper winding of the release relay R420, to the C conductor of the trunk 406, thereby marking the trunk 406 and consequently the repeater 400 as idle to the outgoing toll selectors 300, etc., having access thereto.

This release signal sent over the toll line 702 is received by the tone unit 701 and brings about continuous operation of the signal-in relay R720 in the repeater 700 for a corresponding time interval of approximately two seconds, the release signal being in the form of the continuous pulse of 60 cycle modulated 1000 cycle current of the time duration of approximately two seconds. Upon operating, the signal-in relay R720 completes, at the contacts 722, a multiple circuit for maintaining operated the switchover relay R870, etc., and interrupts, at the contacts 724, a further point in the circuit for operating the supervisory pulse relay R760, thereby causing the latter relay to restore shortly thereafter. Accordingly upon restoring the supervisory pulse relay R760 prevents further operation of the relays mentioned in the repeater 700 to control operation of the tone unit 701 to return the disconnect signal over the toll line 702, all in the manner previously explained. Further the signal-in relay R720 completes, at the contacts 723, the circuit for operating shortly thereafter the interpulse timer relay R730; and completes, at the contacts 726, the circuit for operating the ring control relay R860. Also the signal-in relay R720 interrupts, at the contacts 725, the circuit for maintaining operated the incoming release relay R960 in order to cause the latter relay to restore shortly thereafter, it being of the slow-to-release type. At this point, it is again noted that the incoming release relay R960 is caused to restore at this time as a consequence of the signal-in relay R720 being maintained operated for approximately two seconds as a result of the tone unit 701 receiving the release signal over the toll line 702. Upon restoring, the incoming release relay R960 interrupts, at the contacts 962, the holding circuit for energizing the selector seize relay R950 in order to cause the latter relay to restore. Upon restoring, the selector seize relay R950 interrupts, at the contacts 955, the original path for maintaining operated the line supervisory relay R980, etc., whereby, at this time, the line supervisory relays R980, etc., are maintained operated only by virtue of the closed contacts 722 of the operated signal-in relay R720. Also, upon restoring, the selector seize relay R950 interrupts, at the contacts 951, the path for applying ground potential to the C conductor of the trunk 905 in order to bring about the release of the incoming toll selector 1000 and the inward trunk circuit 1114 in the office 30. When the incoming toll selector 1000 is thus released, the inward trunk circuit 1114 is released and marked as idle to the incoming toll selectors 1000, etc., having access thereto.

At the conclusion of the release signal, the signal-in relay R720 in the repeater 700 restores, interrupting, at the contacts 722, the alternative holding circuit for maintaining operated the line supervisory relays R980, etc., whereby these relays restore. Specifically, the following relays, in the repeater 700, restore when the contacts 722 are opened incident to the restoration of the signal-in relay R720: the sequence relay R780, the supervisory control relay R820, the switchover relay R870, the supervisory relay R830, and the pad cutout relay R700. Also upon restoring, the selector seize relay R950 reprepares, at the contacts 953, the path for applying battery potential by way of the upper winding of the release relay R920 to the C conductor of the trunk 906. Finally, upon restoring, the signal-in relay R720 recompletes, at the contacts 725, the circuit for operating the incoming release relay R960; whereby the latter relay, upon operating, completes, at the contacts 961, the path for applying battery potential by way of the upper winding of the release relay R920 to the C conductor of the trunk 906; whereby the trunk 906 and consequently the repeater 700 are marked as idle to the outgoing toll selectors 1130, etc., having access thereto. Finally, when the contacts 722, are opened, incident to the restoration of the signal-in relay R720, the circuit for illuminating the busy lamp L787 is interrupted in order to indicate the idle condition of the repeater 700. At this time, all of the apparatus involved in the established connection between the operator position 201 in the office 20 and the operator position 1101 in the office 30 is completely released and available for further use.

*Section 5.—Extension of a toll call from the toll switchboard in the office 20 through the office 30 into the office 40*

Considering now the extension of a toll call from the toll switchboard in the office 20 through the office 30 and into the office 40, the operator at the position 201 may again employ the link 202 illustrated; and in this case, the series of digits 4, 6, 2, etc., are registered in the register sender 208 employing the keyset, previously mentioned. In this case, the call switch 204 responds to the first digit 4 to select the group of trunks, including the trunk 220, and then operates automatically to select an idle trunk in the group mentioned; for example, the call switch 204 may select the particular trunk 220 bringing about the seizure of the outgoing toll selector 300, in the manner described in Section 3. The outgoing toll selector 300 responds to the second digit 6 to select the lowermost level of the subgroup of trunks extending to the repeaters 400, etc., then operates automatically to select the lowermost one of the three levels having an idle trunk therein, and then operates automatically to select an idle trunk in the previously selected level, in the manner described in Section 3. For instance, the outgoing toll selector 300 may select the particular trunk 406 in the seventh level extending to the repeater 400, the trunk 406 being marked as idle by the presence of battery potential upon the C conductor thereof, whereby the outgoing toll selector 300 switches-through seizing the repeater 400 and causing the repeater 400 to seize the repeater 700 so that the repeater 700 seizes the incoming toll selector 1000, all in the manner described in Section 4.

In this case, the third digit 2 sent from the register sender 208 is received by the line relay R430 in the repeater 400 and repeated over the toll line 702 to the dial-in relay R880 in the repeater 700, whereby the dial-in relay R880 repeats the digit mentioned over the trunk 905 to the line relay R1020 in the incoming toll selector 1000, in the manner explained in Section 4. The incoming toll selector 1000 responds to the third digit 2 to select the lowermost level of the subgroup of trunks extending to the toll line circuits 1110, etc., then operates automatically to select the lowermost one of the three levels having an idle trunk therein, and then operates automatically to select an idle trunk in the previously selected level, in a manner similar to that described in Section 3 More particularly, when the main wiper set 1002 of the Strowger mechanism 1001 occupies its second, third or fourth levels, the set of normal switch springs S1013 is operated, whereby, at the conclusion of the third digit 2 and incident to the restoration of the series relay R1040, the pulse delay relay R1070 is operated. Thus the pulse delay relay R1070 occupies its operated position during any additional vertical stepping of the main wiper set 1003, as well as during the rotary stepping thereof, whereby the operated pulse delay relay R1070 completes, at the contacts 1072, a path for applying battery potential via the resistor 1013 and the set of switch springs S1011 to the EC conductor of the trunk 905 extending back to the repeater 700. This application of resistance battery potential upon the EC conductor of the trunk 905 constitutes a delay signal and completes a circuit, including the contacts 838, 893 and 955, for energizing in multiple the winding of the wait relay Y800 and the lower winding of the tandem test relay R970, in order to cause the wait relay Y800 to operate, but not to cause operation of the tandem test relay R970, since the latter relay is of the marginal type. Upon operating, the wait relay Y800 completes, at the contacts Y1, a circuit, including the contacts 844, 811 and 955 for operating the wait relay X800. Upon operating, the wait relay X800 interrupts, at the contacts X3, the normally completed path, including the contacts 773, for applying ground potential to the receiving switch conductor C707 extending to the tone unit 701, the removal of ground potential from the receiving switch conductor C707 effecting the restoration of the receiving switch relay in the tone unit 701 so as to place it in sending condition. Also upon operating, the wait relay X800 completes, at the contacts X2, an alternative circuit for operating the send relay R775; and completes, at the contacts X1, a path, including the contacts 989, for applying battery potential via the resistor 963 to the modulation cutoff conductor C708 extending to the tone unit 701, thereby to operate the modulation cutoff relay in the tone unit 701 at this time. Accordingly, the tone unit 701 is rendered operative to send 1000 cycle current over the sending − conductor C701 and the sending + conductor C702 extending therefrom. Upon operating, the send relay R775 completes, at the contacts 776, the previously traced path between the sending − conductor C701 and the sending + conductor C702 and the − and + conductors of the toll line 702, whereby a long pulse of the 1000 cycle current is transmitted from the tone unit 701 via the repeater 700 over the line conductors of the toll line 702. This delay signal thus transmitted over the toll line 702 is received by the tone unit 601 in order to effect operation of the dial-in relay R580 in the repeater 400. Upon operating, the dial-in relay R580 completes, at the contacts 582, a circuit for operating the wait relay Z500. Upon operating, the wait relay Z500 interrupts, at the contacts Z1, the present connection between the upper winding of the line supervisory relay R480 and the EC conductor of the trunk 406; and completes, at the contacts Z2, a path, including the contacts 485, for applying resistance battery potential to the EC conductor of the trunk 406; and completes, at the contacts Z3, a path for applying ground potential to the C conductor of the trunk 406. Also, the wait relay Z500 completes, at the contacts Z4, an alternative circuit for operating the ring control relay R560, whereby the latter relay is operated during the reception of the delay signal. The application of resistance battery potential to the EC conductor of the trunk 406 brings about the delay of the sending of the fourth digit from the sender link 205. This operation involves the pulse delay relay R1220 in the sender link 205 and the pulse delay relay R1230 in the register sender 208 and proceeds in the manner explained in Section 3.

Now assume that the trunk 1113 extending to the toll line circuit 1110 and terminated in the third level is the first idle trunk in the group mentioned appearing before the incoming toll selector 1000, the main wiper set 1002 is driven the additional step in the vertical direction by the vertical magnet M1003 and is then driven in the rotary direction by the rotary magnet M1005 to select the trunk 1113, whereby the switch relay R1080 in the incoming toll selector 1000 is operated effecting the restoration of the changeover relay R1060 and the line relay R1020, whereby the release relay R1030 and the delay pulsing relay R1070 are restored shortly thereafter, the last-mentioned relay being of the slow-to-release type. At this time, the incoming toll selector 1000 occupies its switched-through position; and the pulse delay relay R1070, upon restoring, interrupts, at the contacts 1072, the path for applying resistance battery potential upon the EC conductor of the trunk 905 extending from the repeater 700, so as to bring about the restoration of the wait relay Y800 therein. Upon restoring, the wait relay Y800 effects the restoration of the wait relay X800, whereby the latter relay effects the restoration of the send relay R775 so as to terminate the sending of the 1000 cycle current over the toll line 702, thus ending the delay signal. In the repeater 400, the dial-in relay R580 restores, effecting the restoration of the wait relay Z500 so that the latter relay recompletes, at the contacts Z1, the connection between the upper winding of the line supervisory relay R480 and the EC conductor of the trunk 406; and interrupts, at the contacts Z2, the path for applying resistance battery potential to the EC conductor of the trunk 406, whereby the pulse delay relay R1220 in the sender link 205 is restored so that the sender link 205 may proceed under the control of the register sender 208 to send the fourth, etc., digits therefrom, to the repeater 400; which digits are repeated from the repeater 400 over the toll line 702 to the repeater 700 and then repeated therefrom over the trunk 905, the incoming toll selector 1000, the trunk 1113, the toll line circuit 1110, and the toll line 1111 into the office 40, in the manner described in Section 4. The subsequent completion of the present toll connection and the ultimate release thereof are the same as described in Section 4.

Recapitulating, in the extension of the present toll call from the operator position 201 in the office 20, through the office 30 into the office 40, the outgoing toll selector 300 responds to the second digit 6 that is sent from the register sender 208 in order to carry out a level hunting operation followed by a rotary hunting operation, whereby the sending of the third digit 2 from the register sender 208 is delayed by virtue of the application of resistance battery potential in the outgoing toll selector 300 upon the EC conductor of the trunk 220. Thereafter the register sender 208 effects the sending of the third digit 2 over the connection, whereby the repeater 400 repeats the digit over the toll line 702 to the repeater 700 causing the repeater 700 to repeat the digit to the incoming toll selector 1000, whereby the incoming toll selector 1000 responds to the third digit 2 that is repeated from the repeater 700 in order to carry out a level hunting operation followed by a rotary hunting operation, whereby the sending of the fourth digit from the register sender 208 is delayed by virtue of the application of resistance battery potential in the incoming toll selector 1000 upon the EC conductor of the trunk 905. Thereafter the register sender 208 effects the sending of the fourth digit over the connection, whereby the repeater 400 repeats the digit over the toll line 702 to the repeater 700 causing the repeater 700 to repeat the digit over the connection, including the toll line 1111, extending into the office 40. Now the application of resistance battery potential in the incoming toll selector 1000 to the EC conductor of the trunk 905 causes the repeater 700 to repeat therefrom over the toll line 702 a corresponding delay signal in the form of a long pulse of 1000 cycle current, whereby the repeater 400 is controlled to bring about the application of resistance battery potential to the EC conductor of the trunk 406, checking the sending operation of the register sender 208, in the manner previously explained.

In view of the foregoing, it will be understood that delaying of the register sender 208 may be brought about not only by the switching apparatus in the office 20 but by the switching apparatus in the office 30, and by the switching apparatus in the more remote office 40, in an identical manner.

*Section 6.—Conclusions*

From the foregoing description of the extension of a toll call from the office 10 to the toll switchboard in the office 20 and the further extension of the toll call therefrom, as described in Section 3, it will be understood that a toll call from the office 40 to the toll switchboard in the office 30 and the further extension of the toll call therefrom may be carried out in an identical manner. Similarly, the extension of a toll call from the toll switchboard in the office 30 to the toll switchboard in the office 20 is identical to the extension of a toll call in the opposite direction, as described in Section 4. Finally, the extension of a toll call from the toll switchboard in the office 30 through the office 20 into the office 10 proceeds in a manner identical to the extension of the toll call in the opposite direction, as described in Section 5.

In view of the foregoing, it is apparent that a toll switching telephone system has been provided that comprises an improved arrangement for selectively controlling the sending operation of the register sender at an operator switchboard both from the switching apparatus in the same exchange and from switching apparatus in remote exchanges, notwithstanding the circumstance that the exchanges mentioned are interconnected by toll lines that are terminated by repeaters of the voice frequency dialing type.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a telephone system, an operator switchboard, first and second repeaters interconnected by a toll line, means controllable from said operator switchboard for completing a first connection therefrom to said first repeater, means included in said first repeater and responsive to the completion of said first connection thereto for transmitting therefrom a seizure signal in the form of a short pulse of a given frequency in the audio frequency band modulated by a predetermined lower frequency over said toll line, automatic switching apparatus, means included in said second repeater and responsive to said seizure signal received over said toll line for completing a second connection therefrom to said switching apparatus, a register sender operatively associated with said operator switchboard, means controllable from said operator switchboard for registering a series of digits in said register sender, means included in said register sender and responsive to the registration of said series of digits therein for sending therefrom a corresponding series of digit signals over said first connection, means included in said first repeater and responsive to said series of digit signals received over said first connection for repeating therefrom a corresponding series of digit signals each in the form of a series of short pulses of said given frequency over said toll line, means included in said second repeater and responsive to said series of digit signals received over said toll line for repeating therefrom a corresponding series of digit signals over said second connection, a group of trunks, said switching apparatus being operated by a given digit signal in said series received over said second connection to select an idle one of the trunks in said group, means included in said switching apparatus and controlled during operation thereof for returning therefrom a delay signal over said second connection, means included in said second repeater and responsive to said delay signal received over said second connection for repeating therefrom a corresponding delay signal in the form of a long pulse of said given frequency over said toll line, means included in said first repeater and responsive to said delay signal received over said toll line for repeating therefrom a corresponding delay signal over said first connection, means included in said register sender and responsive to said delay signal received over said first connection for delaying the sending therefrom of the digit signal next following said given digit signal in said series over said first connection, and means included in said switching apparatus and responsive to operation thereof to select said one trunk for switching-through said switching apparatus so that the remaining digit signals in said series repeated over said second connection are transmitted over said one trunk.

2. The telephone system set forth in claim 1, wherein said switching apparatus is of the Strowger type and is arranged for both vertical level hunting and rotary contact position hunting in its operation by said given digit signal received over said second connection to select said one idle trunk in said group.

3. In a telephone system, an operator switchboard, first automatic switching apparatus, means controllable from said operator switchboard for completing a first connection therefrom to said first switching apparatus, a register sender operatively associated with said operator switchboard, means controllable from said operator switchboard for registering a series of digits in said register sender, means included in said register sender and responsive to the registration of said series of digits therein for sending therefrom a corresponding series of digit signals over said first connection, first and second repeaters interconnected by a toll line, said first switching apparatus being operated by a given digit signal in said series received over said first connection to select said first repeater, means included in said first switching apparatus and controlled during operation thereof to select said first repeater for returning therefrom a delay signal over said first connection, said register sender including delay mechanism operated by said delay signal returned over said first connection to delay the sending therefrom of the digit signal next following said given digit signal in said series over said first connection, means included in said first repeater and responsive to the selection thereof by said first switching apparatus for transmitting therefrom a seizure signal in the form of a short pulse of a given frequency in the audio frequency band modulated by a predetermined lower frequency over said toll line, second automatic switching apparatus, means included in said second repeater and responsive to said seizure signal received over said toll line for completing a second connection therefrom to said second switching apparatus, means included in said first switching apparatus and responsive to operation thereof to select said first repeater for switching-through said first switching apparatus so that the remaining digit signals in said series sent over said first connection are transmitted to said first repeater, means included in said first repeater and responsive to the remaining digit signals in said series received over said first connection for repeating therefrom a corresponding series of digit signals each in the form of a series of short pulses of said given frequency over said toll line, means included in said second repeater and responsive to said series of digit signals received over said toll line for repeating therefrom a corresponding series of digit signals over said second connection, a group of trunks, said second switching apparatus being operated by a predetermined digit signal in said series received over said second connection to select an idle one of the trunks in said group, means included in said second switching apparatus and controlled during operation thereof to select said one trunk for returning therefrom a delay signal over said second connection, means included in said second repeater and responsive to said delay signal received over said second connection for repeating therefrom a corresponding delay signal in the form of a long pulse of said given frequency over said toll line, means included in said first repeater and responsive to said delay signal received over said toll line for repeating therefrom a corresponding delay signal over said first connection, said delay mechanism in said register sender being reoperated by said last-mentioned delay signal returned over said first connection to delay the sending therefrom of the digit signal next following said predetermined digit signal in said series over said first connection, and means included in said second switching apparatus and responsive to operation thereof to select said one trunk for switching-through said second switching apparatus so that the remaining digit signals in said series repeated over said second connection are transmitted over said one trunk.

4. In a telephone system, an operator switchboard, a repeater provided with an incoming trunk and terminating a toll line, means controllable from said operator switchboard for completing a connection therefrom over said incoming trunk to said repeater, means included in said repeater and responsive to the completion of said connection thereto for transmitting therefrom a seizure signal in the form of a short pulse of a given frequency in the audio frequency band modulated by a predetermined lower frequency over said toll line, a register sender operatively associated with said operator switchboard, means controllable from said operator switchboard for registering a series of digits in said register sender, means included in said register sender and responsive to the registration of said series of digits therein for sending therefrom a corresponding series of digit signals over said incoming trunk, means included in said repeater and responsive to said series of digit signals received over said incoming trunk for repeating therefrom a corresponding series of digit signals each in the form of a series of short pulses of said given frequency over said toll line, means included in said repeater and responsive to the return of a delay signal in the form of a long pulse of said given frequency over said toll line for repeating therefrom a corresponding delay signal over said incoming trunk, means included in said register sender and responsive to said delay signal received over said incoming trunk for delaying the sending therefrom of succeeding ones of said digit signals over said incoming trunk, means included in said repeater and responsive to the return of an end-of-dial signal in the form of a short pulse of said given frequency over said toll line for repeating therefrom a corresponding end-of-dial signal over said incoming trunk, and means included in said operator switchboard and responsive to said end-of-dial signal received over said incoming trunk for rendering an end-of-dial indication to said operator switchboard.

5. The telephone system set forth in claim 4, wherein said incoming trunk includes a pair of line conductors and a hold conductor and a control conductor, said repeater is held from said operator switchboard by the application of a hold potential upon said hold conductor, said digit signals are sent over said line conductors, and said relay signal and said end-of-dial signal are repeated over said control conductor.

6. The telephone system set forth in claim 5, wherein said delay signal is repeated over said control conductor in the form of a short pulse of direct current of one polarity and said end-of-dial signal is repeated over said control conductor in the form of a short pulse of direct current of the opposite polarity.

7. In a telephone system, an operator switchboard, a repeater provided with an incoming trunk and terminating a toll line, means controllable from said operator switchboard for completing a connection therefrom over said incoming trunk to said repeater, means included in said repeater and responsive to the completion of said connection thereto for transmitting therefrom a seizure signal in the form of a short pulse of a given frequency in the audio frequency band modulated by a predetermined lower frequency over said toll line, a register sender operatively associated with said operator switchboard, means controllable from said operator switchboard for registering a series of digits in said register sender, means included in said register sender and responsive to the registration of said series of digits therein for sending therefrom a corresponding series of digit signals over said incoming trunk, means included in said repeater and responsive to said series of digit signals received over said incoming trunk for repeating therefrom a corresponding series of digit signals each in the form of a series of short pulses of said given frequency over said toll line, means included in said repeater and responsive to the return of a delay signal in the form of a long pulse of said given frequency over said toll line for repeating therefrom a corresponding delay signal over said incoming trunk, means included in said register sender and responsive to said delay signal received over said incoming trunk for delaying the sending therefrom of succeeding ones of said digit signals over said incoming trunk, means included in said repeater and responsive to the return of an end-of-dial signal and of an answer signal and of a disconnect signal each in the form of a short pulse of said given frequency modulated by said predetermined frequency over said toll line for repeating therefrom a corresponding end-of-dial signal and a corresponding answer signal and a corresponding disconnect signal over said incoming trunk, and means included in said operator switchboard and responsive to said end-of-dial signal and said answer signal and said disconnect signal received over said incoming trunk for rendering a corresponding end-of-dial indication and a corresponding answer indication and a corresponding disconnect indication to said operator switchboard.

8. The telephone system set forth in claim 7, wherein said incoming trunk includes a pair of line conductors and a hold conductor and a control conductor, said repeater is held from said operator switchboard by the application of a hold potential upon said hold conductor, said digit signals are sent over said line conductors, and said delay signal and said end-of-dial signal and said answer signal and said disconnect signal are repeated over said control conductor.

9. The telephone system set forth in claim 7, and further comprising means controllable from said operator switchboard for releasing said connection therefrom over said incoming trunk to said repeater, and means included in said repeater and responsive to the release of said connection thereto from said operator switchboard for transmitting therefrom a release signal in the form of a long pulse of said given frequency modulated by said predetermined frequency over said toll line.

10. In a telephone system, calling and called repeaters interconnected by a toll line, said calling repeater also including an incoming trunk, said called repeater also including an outgoing trunk, means included in each of said repeaters and responsive to trunk supervisory signals received over the associated trunk for repeating over said toll line corresponding toll supervisory signals in the form of pulses of a given frequency in the audio frequency band modulated by a predetermined lower frequency, means included in said calling repeater and responsive to trunk dialing signals received over said incoming trunk for repeating over said toll line corresponding toll dialing signals in the form of pulses of said given frequency, means included in said called repeater and responsive to a trunk delay signal received over said outgoing trunk for repeating over said toll line a corresponding toll delay signal in the form of a pulse of said given frequency, and means including voice current repeating apparatus of the vacuum tube type incorporated in said toll line for repeating said toll signals between adjacent sections of said toll line disposed on opposite sides thereof and between said calling and called repeaters.

11. The telephone system set forth in claim 10, wherein each of said repeaters also includes means responsive to a toll supervisory signal received over said toll line for repeating a corresponding trunk supervisory signal over the associated trunk, said called repeater also includes means responsive to a toll dialing signal received over said toll line for repeating a corresponding trunk dialing signal over said outgoing trunk, and said calling repeater also includes means responsive to a toll delay signal received over said toll line for repeating a corresponding trunk delay signal over said incoming trunk.

12. The telephone system set forth in claim 11, wherein all of said trunk signals repeated over said incoming and outgoing trunks are in the form of pulses of direct current.

References Cited in the file of this patent

UNITED STATES PATENTS

| | | |
|---|---|---|
| Re. 22,441 | King et al. | Feb. 22, 1944 |
| 2,337,433 | Walsh | Dec. 21, 1943 |
| 2,626,996 | Brown | Jan. 27, 1953 |